(12) United States Patent
Nou et al.

(10) Patent No.: US 11,078,866 B1
(45) Date of Patent: Aug. 3, 2021

(54) COMBUSTION-CHAMBER STRUCTURE OF ENGINE

(71) Applicant: MAZDA MOTOR CORPORATION, Hiroshima (JP)

(72) Inventors: Yoshihisa Nou, Aki-gun (JP); Osamu Aoki, Aki-gun (JP); Yuji Harada, Aki-gun (JP); Kenji Uchida, Aki-gun (JP); Xiyao Ge, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/138,416

(22) Filed: Dec. 30, 2020

(30) Foreign Application Priority Data

Apr. 1, 2020 (JP) .............................. JP2020-065717

(51) Int. Cl.
| | |
|---|---|
| *F01P 1/04* | (2006.01) |
| *F02F 3/04* | (2006.01) |
| *F02F 3/22* | (2006.01) |
| *F01P 3/10* | (2006.01) |
| *F01P 3/00* | (2006.01) |

(52) U.S. Cl.
CPC ...... *F02F 3/04* (2013.01); *F01P 3/10* (2013.01); *F02F 3/225* (2013.01); *F01P 2003/006* (2013.01)

(58) Field of Classification Search
CPC ....... F02F 3/12; F02F 3/14; F02F 3/10; F05C 2251/048; F02B 77/11; F02B 23/0603; F02B 77/02
USPC ....................................................... 123/41.35
See application file for complete search history.

(56) References Cited

U.S. PATENT DOCUMENTS

| | | | | |
|---|---|---|---|---|
| 3,911,891 A | * | 10/1975 | Dowell ..................... | F02F 3/12 123/669 |
| 4,774,926 A | * | 10/1988 | Adams ..................... | F02B 77/02 123/188.3 |
| 5,033,427 A | * | 7/1991 | Kawamura ............. | F02B 77/11 123/193.3 |
| 5,384,200 A | * | 1/1995 | Giles ........................ | C23C 4/11 428/552 |
| 2008/0250923 A1 | * | 10/2008 | Mitsui ...................... | F02F 3/12 92/248 |

(Continued)

FOREIGN PATENT DOCUMENTS

JP 2018-172997 A 11/2018

*Primary Examiner* — Long T Tran
*Assistant Examiner* — James J Kim
(74) *Attorney, Agent, or Firm* — Studebaker & Brackett PC

(57) ABSTRACT

A combustion-chamber structure of an engine comprises a combustion chamber which is partitioned by a cylinder block, a cylinder head, and a piston. The piston includes a piston body having an upper surface facing the combustion chamber, a heat-insulation layer provided at least in a central area, in a radial direction, of the upper surface and having smaller heat conductivity than the piston body, a heat-barrier layer provided to cover the upper surface and having smaller heat conductivity than the piston body and the heat-insulation layer, and a heat-diffusion layer provided between the heat-insulation layer and the heat-barrier layer and having larger heat conductivity than the heat-insulation layer and the heat-barrier layer. The heat-diffusion layer comprises a side end edge and an extension portion which contact with the piston body.

20 Claims, 15 Drawing Sheets

(56) References Cited

U.S. PATENT DOCUMENTS

| | | | |
|---|---|---|---|
| 2009/0260594 A1* | 10/2009 | Hara | B23P 15/10 |
| | | | 123/193.6 |
| 2018/0057954 A1* | 3/2018 | Yamashita | C25D 11/243 |
| 2018/0094603 A1* | 4/2018 | Taguchi | C23C 28/321 |

* cited by examiner

FIG. 4
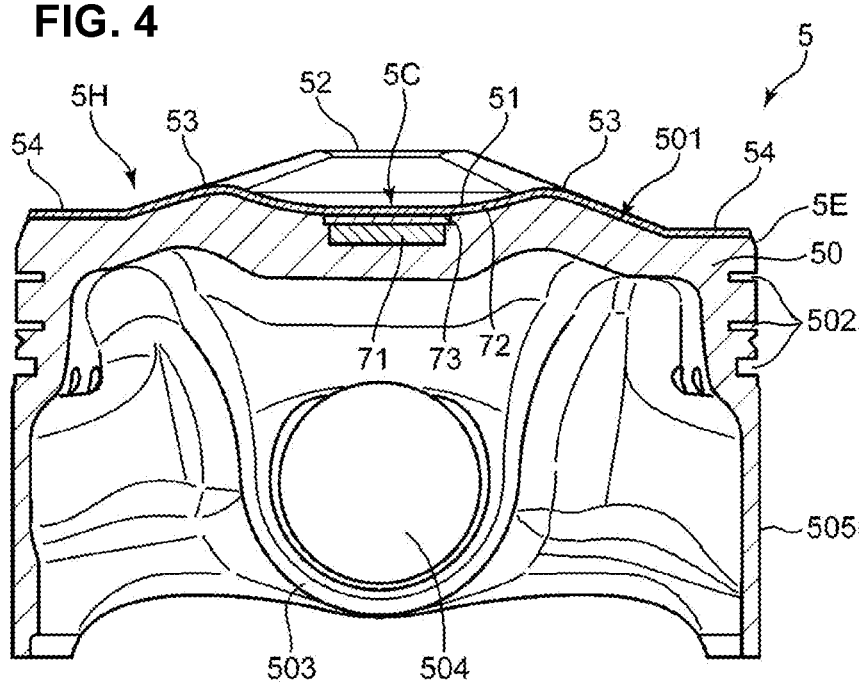
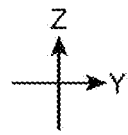
FIG. 5
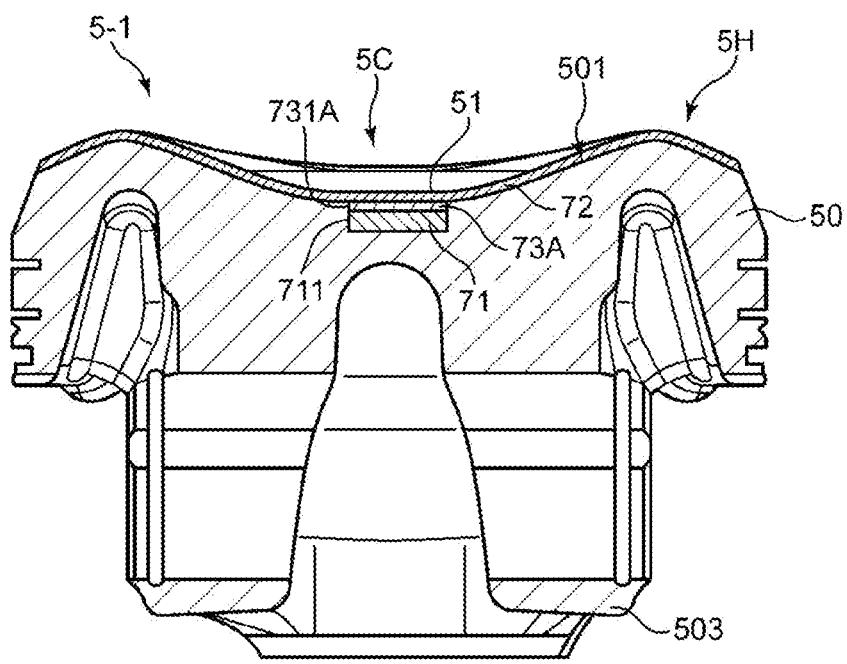

FIG. 7

| | | heat conductivity λ | volume specific heat ρc | heat diffusivity λ/ρc | | Z-directional thickness t (mm) | heat resistance t/λ | heat permeability √λρc |
|---|---|---|---|---|---|---|---|---|
| heat-barrier layer | | 0.2 | 1000 | 0.0002 | 1 | 0.075 | 0.3750 | 14 |
| heat-diffusion layer | Cu based material | 400 | 3500 | 0.1143 | 571 | 2 | 0.0050 | 1183 |
| | Corson alloy | 239 | 3349.5 | 0.0714 | 357 | 2 | 0.0084 | 895 |
| | beryllium copper | 125 | 3460 | 0.0361 | 181 | 2 | 0.0160 | 658 |
| | fiber-reinforced aluminum | 100 | 3120 | 0.0321 | 160 | 2 | 0.0200 | 559 |
| | titanium aluminum | 40 | 2340 | 0.0171 | 85 | 2 | 0.0050 | 306 |
| heat-insulation layer | calcium silicate | 0.24 | 2000 | 0.00012 | 0.6 | 2 | 8.3333 | 22 |
| | ZrO₂ zirconia | 3 | 2576 | 0.0012 | 6 | 2 | 0.6667 | 88 |
| | porous SUS based material | 5 | 2352 | 0.0021 | 11 | 3.5 | 0.7000 | 108 |
| | ↑(relative density: large) | 8 | 2970 | 0.0027 | 13 | 5 | 0.6250 | 154 |
| cylinder block/head base material | AC4B | 96 | 2667 | 0.0360 | 180 | 6 | 0.0625 | 506 |
| piston base material | AC8A | 125 | 2600 | 0.0481 | 240 | 4 | 0.0320 | 570 |
| intake valve base material | SUH11 | 25 | 3850 | 0.0065 | 32 | 4 | 0.1600 | 310 |
| exhaust valve base material | SUH35 | 18 | 3565 | 0.0050 | 25 | 4 | 0.2222 | 253 |
| | | (W/mK) | (kJ/m³·K) | | | | (m²·K/W) | |

Low-Load Engine Operation

Middle/High-Load Engine Operation

COMBUSTION-CHAMBER STRUCTURE OF ENGINE

BACKGROUND OF THE INVENTION

The present invention relates to a combustion-chamber structure of an engine which comprises a heat-barrier layer to suppress heat loss.

A combustion chamber of a gasoline engine or the like for a vehicle is required to decrease heat dissipation (heat loss) through a wall surface of the combustion chamber. A technology that a heat-barrier layer which is made of a small heat-conductivity material is coated on the combustion-chamber wall surface, such as a crown surface of a piston, for heat-loss reduction is known. A temperature difference between combustion gas generated in the combustion chamber and the combustion-chamber wall surface is made so small by providing the heat-barrier layer that the heat loss can be reduced.

A homogeneous-charge compression-ignition combustion engine (in other words, a premixed compression-ignition combustion engine) in which a mixture of premixed fuel and air is self-ignited in the combustion chamber is known as a kind of the gasoline engine. This homogeneous-charge compression-ignition combustion engine has features that the mixture combustion starts concurrently at every places in the combustion chamber. Thereby, there are merits of fuel-economy improvement, exhaust-gas purification, or the like. On the other hand, since flames which are generated instantly in the combustion chamber contact with the combustion-chamber wall surface, the heat loss through the combustion-chamber wall surface may improperly increase. Further, there is a problem that a pressure inside the combustion chamber, i.e., a cylinder internal pressure, may increase rapidly according to the above-described concurrent combustion of the mixture at every places in the combustion chamber. This increase of the cylinder internal pressure may cause a large combustion noise and apply a large load to the combustion chamber and various parts of an engine mechanism.

Japanese Patent Laid-Open Publication No. 2018-172997 discloses a combustion-chamber structure, as a countermeasure for this problem, in which a heat-barrier layer and a heat-insulation layer are provided at a piston crown surface. This heat-barrier layer covers an entire part of the piston crown surface, thereby suppressing the heat dissipation through a piston body. This heat-insulation layer is provided below the heat-barrier layer and in a central area, in a radial direction, of the piston crown surface, thereby making this central area be the area where the heat does not escape easily. Thereby, the self-ignition occurs at the central area, in the radial direction, of the combustion chamber and there occurs initial combustion at this central area. Subsequently, a flame (combustion) expands toward an outside area, in the radial direction, of the combustion chamber where the temperature is relatively low. Accordingly, the mixture can be burned slowly even if the homogeneous-charge compression-ignition combustion type is adopted, so that the heat loss and the rapid increase of the cylinder internal pressure can be suppressed.

The combustion-chamber structure disclosed in the above-described patent document is useful in the homogeneous-charge compression-ignition combustion at a relatively-low load engine operation, for example. However, it has been found that in the homogeneous-charge compression-ignition combustion or spark-ignition combustion at a relatively-high load engine operation, there occurs a problem that the above-described heat-insulation layer may store the heat excessively. That is, the heat-insulation layer may store the heat which has not been insulated (blocked) by the above-described heat-barrier layer, so that the heat-insulation layer having an increased temperature may heat the heat-barrier layer. Consequently, the cylinder internal temperature may increase and air taken in an intake stroke of the engine may be heated excessively, so that improper preignition may occur in a compression stroke of the engine.

SUMMARY OF THE INVENTION

An object of the present invention is to provide a combustion-chamber structure of an engine which can properly suppress the temperature increase of the heat-barrier layer which may cause the preignition, attaining the heat-loss reduction.

A first aspect of the present invention is a combustion-chamber structure of an engine, comprising a cylinder block, a cylinder head, a piston, and a combustion chamber partitioned by the cylinder block, the cylinder head, and the piston, wherein the piston includes a piston body which has an upper surface facing the combustion chamber, a heat-insulation layer which is provided at least in a central area, in a radial direction, of the upper surface of the piston body and has smaller heat conductivity than the piston body, a heat-barrier layer which is provided to cover the upper surface of the piston and has smaller heat conductivity than the piston body and the heat-insulation layer, and a heat-diffusion layer which is provided between the heat-insulation layer and the heat-barrier layer and has larger heat conductivity than the heat-insulation layer and the heat-barrier layer, and the heat-diffusion layer comprises a contact portion which contacts with the piston body.

According to the combustion-chamber structure of this first aspect of the present invention, the heat transferred to the heat-insulation layer is not stored at this heat-insulation layer and thereby a structure to make the heat escape toward the piston body can be provided. That is, the heat-diffusion layer is formed between the heat-insulation layer and the heat-barrier layer. This heat-diffusion layer has the larger heat conductivity than both the heat-insulation layer and the heat-barrier layer and comprises the contact portion contacting with the piston body. Accordingly, even if the heat-insulation layer has stored the heat, this stored heat can be made to transfer to the piston body through the heat-diffusion layer. That is, the heat stored at the heat-insulation layer can be made to escape to the piston body, without being made to transfer to the heat-barrier layer. Accordingly, the temperature increase of the heat-barrier layer is so suppressed that the increase of the cylinder internal temperature which may cause the preignition can be prevented properly.

In the above-described combustion-chamber structure, it is preferable that the piston body comprise a cavity which is concaved downwardly, in a cylinder axial direction, at the upper surface, and the cavity be located at a position which corresponds to the central area, in the radial direction, of the upper surface of the piston.

The cavity forming area located at the central area, in the radial direction, of the combustion chamber increases its temperature during the combustion. According to this combustion-chamber structure, the heat-insulation layer is located at a portion of the position where the cavity is arranged. That is, the heat-insulation layer is provided at a back-face side of the heat-barrier layer in an area where the temperature of the piston becomes high during the combustion. Accordingly, a temperature difference between the combustion gas inside the combustion chamber and the heat-barrier layer (piston crown surface) can be made as small as possible, so that the heat loss can be reduced properly. Meanwhile, since the heat of the heat-insulation layer is made to escape to the piston body via the heat-diffusion layer, the temperature of the heat-barrier layer can be prevented from increasing excessively.

In the above-described combustion-chamber structure, it is preferable that the heat-diffusion layer comprise an extension portion which extends outwardly, in the radial direction, from an outer peripheral edge of the heat-insulation layer, and the extension portion be the contact portion which contacts with the piston body.

According to this combustion-chamber structure, a contact area of the heat-diffusion layer with the piston body can be made properly large, compared to a case where the heat-diffusion layer and the heat-insulation layer have the same size and a side edge portion of the heat-diffusion layer is the contact portion contacting with the piston body. Accordingly, the heat of the heat-insulation layer can be made to easily escape to the piston body.

In the above-described combustion-chamber structure, it is preferable that an outer peripheral edge of the heat-diffusion layer extend up to an outer peripheral edge of the upper surface of the piston body.

According to this combustion-chamber structure, the heat of the heat-insulation layer can be made to more easily escape to the piston body.

In the above-described combustion-chamber structure, the combustion-chamber structure can further comprise an oil jet device to inject cooing oil, wherein the piston body comprises a penetration hole which penetrates the piston body in the cylinder axial direction, the heat-diffusion layer comprises a seal portion which seals a part of the penetration hole near the upper surface of the piston body, and the oil jet device is configured to inject the cooling oil from below the penetration hole toward the seal portion of the heat-diffusion layer.

According to this combustion-chamber structure, the contact portion of the heat-diffusion layer with the piston body is so secured at the seal portion that a heat-dissipation path (route) of the heat-insulation layer can be secured. Additionally, the heat-diffusion layer can be cooled by the jet device's injecting the oil toward the seal portion. Accordingly, the temperature of the heat-barrier layer can be prevented from increasing excessively.

In the above-described combustion-chamber structure, it is preferable that the heat conductivity of the heat-barrier layer be within a range of 0.05-1.50 W/mK, and the heat conductivity of the heat-diffusion layer be within a range of 35-600 W/mK.

Further, in the above-described combustion-chamber structure, it is preferable that the heat-barrier layer be made of heat-resistant silicon resin, and the heat-diffusion layer be made of copper-based material, Corson alloy, beryllium copper, fiber-reinforced aluminum alloy, or titanium aluminum.

Another aspect of the present invention is a combustion-chamber structure of an engine, comprising a cylinder block, a cylinder head, a piston, and a combustion chamber partitioned by the cylinder block, the cylinder head, and the piston, wherein the piston comprises a piston body which has an upper surface facing the combustion chamber, a heat-insulation layer which is provided only in a central area, in a radial direction, of the upper surface of the piston body and has smaller heat conductivity than the piston body, a heat-diffusion layer which is provided to cover an entire part of an upper surface of the heat-insulation layer and has larger heat conductivity than the heat-insulation layer, and a heat-barrier layer which is provided to cover at least both of an entire part of an upper surface of the heat-diffusion layer and an outside area, in the radial direction, of the upper surface of the piston body and has smaller heat conductivity than the piston body, the heat-insulation layer, and the heat-diffusion layer, and the heat-diffusion layer comprises a contact portion which contacts with the piston body.

Further another aspect of the present invention is a combustion-chamber structure of an engine, comprising a cylinder block, a cylinder head, a piston, and a combustion chamber partitioned by the cylinder block, the cylinder head, and the piston, wherein the piston comprises a piston body which has an upper surface facing the combustion chamber, a heat-insulation layer which is provided only in a central area, in a radial direction, of the upper surface of the piston body and has smaller heat conductivity than the piston body, a heat-diffusion layer which is provided to cover both of an entire part of an upper surface of the heat-insulation layer and an outside area, in the radial direction, of the upper surface of the piston body and has larger heat conductivity than the heat-insulation layer, and a heat-barrier layer which is provided to cover an entire part of an upper surface of the heat-diffusion layer and has smaller heat conductivity than the piston body, the heat-insulation layer, and the heat-diffusion layer, and the heat-diffusion layer comprises a contact portion which contacts with the piston body.

The combustion-chamber structures of the above-described other aspects of the present invention can provide substantially the same effects as that of the above-described aspect of the present invention.

The present invention will become apparent from the following description which refers to the accompanying drawings.

BRIEF DESCRIPTION OF THE DRAWINGS

FIG. 4 is a sectional view taken along line IV-IV of FIG. 2.

FIG. 5 is a sectional view of a piston according to another embodiment.

FIG. 7 is a chart showing materials which are applicable to respective structural members of the combustion-chamber structure of the engine.

DETAILED DESCRIPTION OF THE INVENTION

[Entire Structure of Engine]

Figure 1:
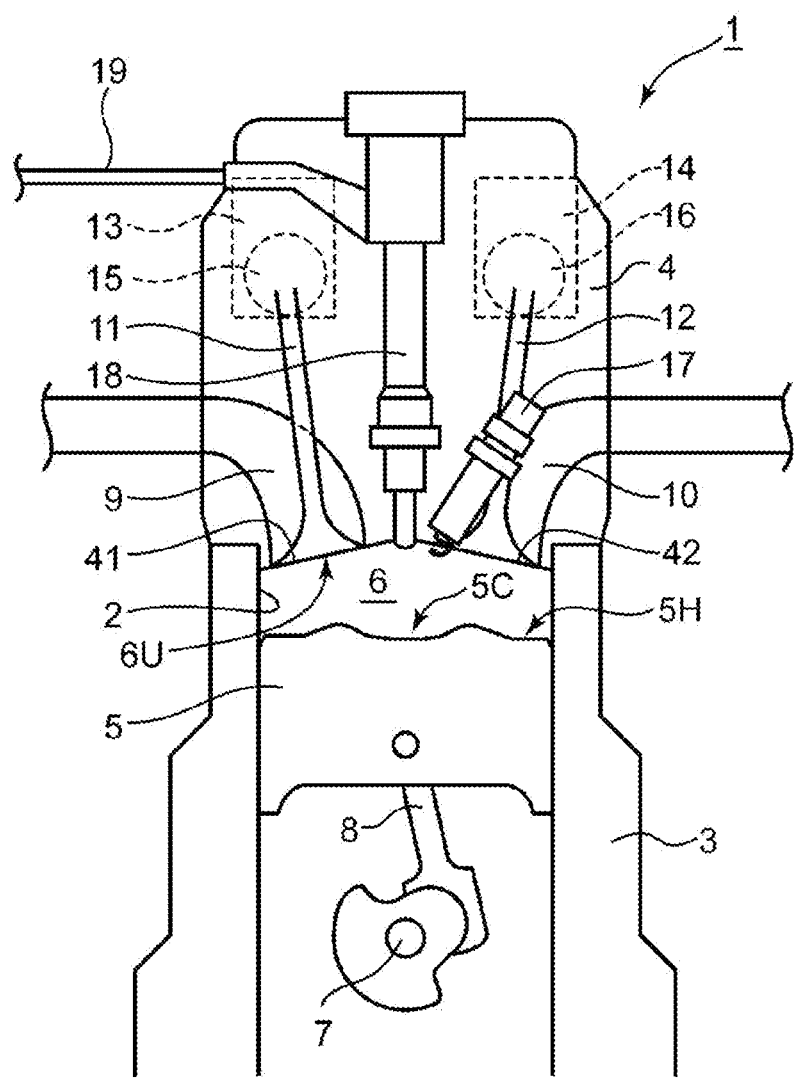
FIG. 1 is a schematic sectional view showing an engine to which a combustion-chamber structure according to an embodiment of the present invention is applied.

Hereafter, a combustion-chamber structure of an engine according to an embodiment of the present invention will be described specifically referring to the drawings. FIG. 1 is a schematic sectional view showing an engine to which the combustion-chamber structure according to the embodiment of the present invention is applied. The engine described here is a multi-cylinder engine which includes cylinders and pistons and is installed to the vehicle as a power source for driving a vehicle, such as an automotive vehicle. The engine includes an engine body 1, intake-exhaust manifolds, not illustrated, which are assembled to the engine body 1, and auxiliary devices, such as various kinds of pumps.

The engine body 1 of the present embodiment is capable of performing the spark-ignition combustion (SI combustion) in which the mixture of fuel and air is ignited by spark in the combustion chamber and the homogeneous-charge compression-ignition combustion (HCCI combustion) in which the mixture is self-ignited. A principle ingredient of the fuel supplied to the engine body 1 is gasoline. Generally, the spark-ignition combustion is performed in a high-load high-speed engine operation, whereas the homogeneous-charge compression-ignition combustion is performed in a middle/low-load middle/low-speed engine operation at the engine body 1. Herein, the present invention is applicable to a combustion chamber of the engine which is unable to perform the homogeneous-charge compression-ignition combustion.

The engine body 1 comprises a cylinder block 3, a cylinder head 4, and pistons 5. The cylinder block 3 has plural cylinders 2 (only one of these is illustrated in the figure) which are arranged in a direction perpendicular to a paper plane of FIG. 1. The cylinder head 4 is attached to an upper face of the cylinder block 3 so as to close respective upper openings of the cylinders 2. The piston 5 is stored in each cylinder 2 such that the piston 5 reciprocates therein and connected to a crankshaft 7 via a connecting rod 8. The crankshaft 7 rotates around a central axis thereof according to a reciprocating movement of the piston 5.

A combustion chamber 6 is partitioned above the piston 5. An intake port 9 and an exhaust port 10 which respectively connect to the combustion chamber 6 are formed at the cylinder head 4. At a bottom surface 4a (ceiling surface 6U) of the cylinder head 4 are formed an intake-side opening portion 41 which is a downstream end of the intake port 9 and an exhaust-side opening portion 42 which is an upstream end of the exhaust port 10.

An intake valve 11 to open/close the intake-side opening portion 41 and an exhaust valve 12 to open/close the exhaust-side opening portion 42 are assembled to the cylinder head 4. In a case of a double overhead camshaft (DOHC) type engine, for example, the two intake-side opening portions 41 and the two exhaust-side opening portions 42 are provided at each of the cylinders 2, and the two intake valves 11 and the two exhaust valves 12 are provided as well. The intake valve 11 and the exhaust valve 12 are a poppet type of valve which comprises an umbrella part and a stem part, respectively.

In the present embodiment, the combustion chamber 6 is partitioned by the cylinder block 3, the cylinder head 4, and the piston 5. More specifically, a combustion-chamber wall surface which partitions the combustion chamber 6 comprises an inner wall surface of the cylinder 2, a piston crown surface 5H (hereafter, referred to as a "crown surface 5H" simply) which is the upper surface of the piston 5, the combustion-chamber ceiling surface 6U which is a bottom surface of the cylinder head 4, and respective valve heads of the intake valve 11 and the exhaust valve 12.

An intake-side valve driving mechanism 13 and an exhaust-side valve driving mechanism 14 which drive the intake valves 11 and the exhaust valve 12, respectively, are provided at the cylinder head 4. The respective stem parts of the intake valves 11 and the exhaust valve 12 are driven linked with the rotation of the crankshaft 7 by these valve driving mechanisms 13, 14. Thus, the valve head of the intake valve 11 opens/closes the intake-side opening portion 41, and the valve head of the exhaust valve 12 opens/closes the exhaust-side opening portion 42.

The intake-side valve driving mechanism 13 comprises an intake-side variable valve timing mechanism (intake-side S-VT) 15. The intake-side S-VT 15 is an electrical type of S-VT which is provided at an intake camshaft and configured to change an opening/closing timing of the intake valve 11 by continuously changing a rotational phase of the intake camshaft relative to the crankshaft 7 within a specified angle range. Likewise, the exhaust-side valve driving mechanism 14 comprises an exhaust-side variable valve timing mechanism (exhaust-side S-VT) 16. The exhaust-side S-VT 16 is an electrical type of S-VT which is provided at an exhaust camshaft and configured to change an opening/closing timing of the exhaust valve 12 by continuously changing a rotational phase of the exhaust camshaft relative to the crankshaft 7 within a specified angle range.

A single spark plug 17 to supply ignition energy to the mixture in the combustion chamber 6 is attached to the cylinder head 4 for each cylinder 2. The spark plug 17 is attached to the cylinder head 4 such that it is arranged at a central space, in a radial direction, of combustion chamber 6 and its ignition point is exposed to the inside of the combustion chamber 6. The spark plug 17 discharges a spark from its tip according to a power supply from an ignition circuit, not illustrated, thereby igniting the mixture in the combustion chamber 6. The ignition plug 17 of the present embodiment is used to perform the spark-ignition combustion in the high-load high-speed engine operation. Further, this is also used, when the homogeneous-charge compression-ignition combustion is performed, in a case where it is hard to perform the self-ignition right after an engine start in a cold time, the homogeneous-charge compression-ignition combustion is assisted under a specified load or speed conditions (spark assist), or the like.

A single injector 18 to inject the gasoline, as the principle ingredient of the fuel, from its tip portion into the combustion chamber 6 is attached to the cylinder head 4 for each cylinder 2. A fuel supply pipe 19 is coupled to the injector 18. The injector 18 injects the fuel supplied through the fuel supply pipe 19. A high-pressure fuel pump (not illustrated) which includes a plunger type of pump and the like and is operationally connected to the crankshaft 7 is coupled to an upstream side of the fuel supply pipe 19. A common rail for pressure accumulation which is common to the all cylinders 2 is provided between the high-pressure fuel pump and the fuel supply pipe 19. The fuel pressure-accumulated in the common rail is supplied to the injector 18 of each cylinder 2, and the high-pressure fuel is injected from the injector 18 into the combustion chamber 6.

[Specific Structure of Piston]

Figure 2:
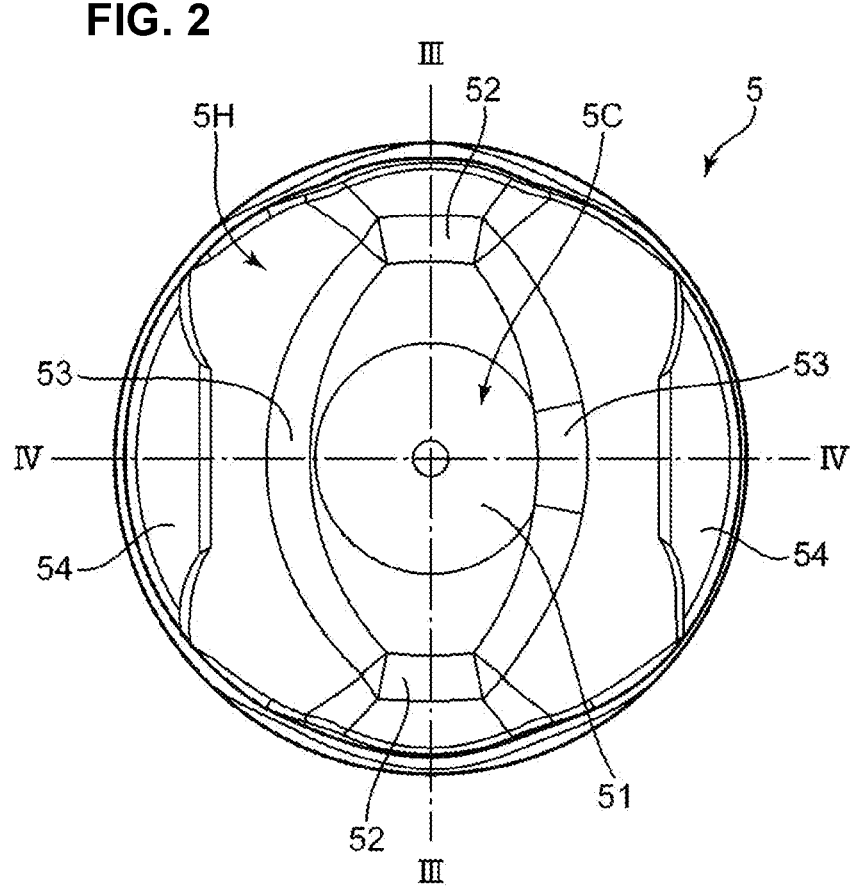
FIG. 2 is a plan view of a crown surface of a piston.
Figure 3A:
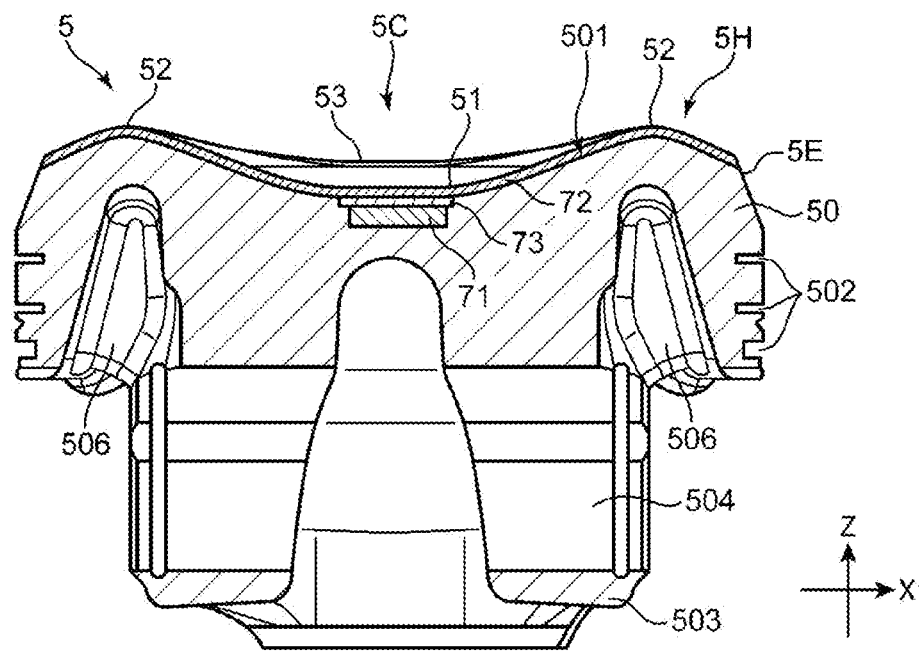
FIG. 3A is a sectional view taken along line of FIG. 2.
Figure 3B:
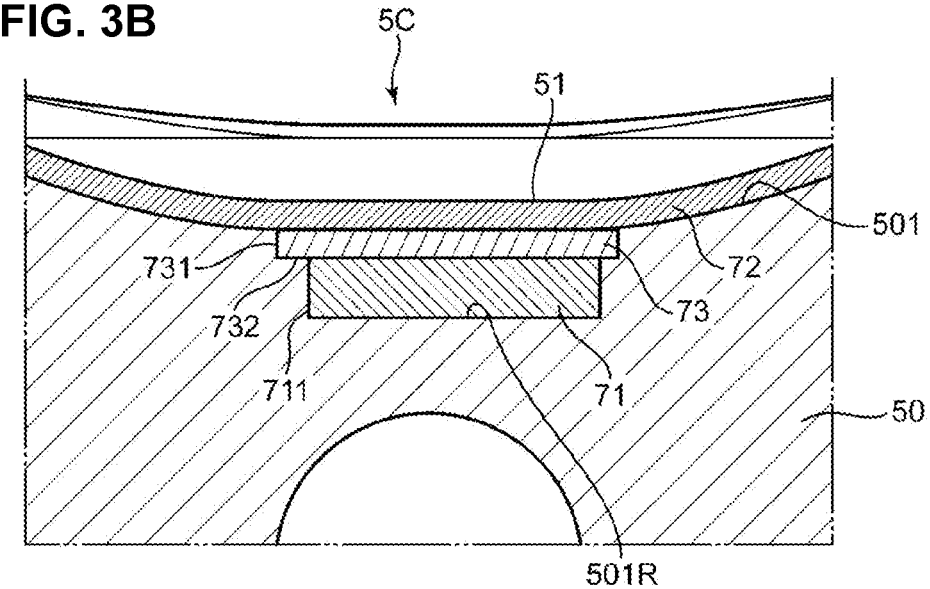
FIG. 3B is a major-part enlarged sectional view of FIG. 3A.

Next, a structure of the piston 5 will be described specifically. FIG. 2 is a plan view of the piston 5. FIG. 3A is a sectional view taken along line of FIG. 2, and FIG. 3B is a major-part enlarged sectional view of FIG. 3A. FIG. 4 is a sectional view taken along line IV-IV of FIG. 2. The piston 5 comprises a piston body 50, a heat-insulation layer 71, a heat-barrier layer 72, and a heat-diffusion layer 73. FIGS. 2-4 have directional indications of X, Y and Z. The X direction is an extension direction of the crankshaft 7, the Y direction is a direction in which the intake port 9 and the exhaust port 10 face each other (a sectional direction of FIG. 1), and the Z direction is a cylinder axial direction (vertical direction).

The piston body 50 is a columnar body which has substantially the same size as a bore radius of the cylinder 2. The piston body 50 comprises an upper surface 501 which faces the combustion chamber 6 and an outer peripheral edge 5E which faces an inner wall of the cylinder 2. Plural ring grooves 502 where piston rings are inserted are provided at the outer peripheral edge 5E. A piston boss 503 and a skirt 505 are integrally provided at a lower side of the piston body 50. A piston pin hole 504 for connecting the connecting rod 8 and the piston 5 is provided at the piston boss 503. A cooling recess portion 506 which is opened downwardly is provided at a portion of the piston body 50 which is located near the outer peripheral edge 5E. Cooling oil is injected to the cooling recess portion 506 from an oil jet nozzle, not illustrated.

The piston body 50 has a cavity 5C which is concaved downwardly, in the cylinder axial direction, at the upper surface 501. The cavity 5C is located at a position which corresponds to the central area, in the radial direction, of the upper surface 501. The injector 18 which is positioned at a center, in the radial direction, of the combustion-chamber ceiling surface 6U injects the fuel toward the cavity 5C. As shown in FIG. 2, the cavity 5C is of an oval shape which is long in the X direction, in a top view, and comprises a bottom face portion 51, a pair of long-diameter side ridgeline portions 52, and a pair of short-diameter side ridgeline portions 53. The bottom face portion 51 is a nearly-flat circular area which is located at a deepest position of the cavity 5C.

The long-diameter side ridgeline portion 52 is an opening edge, in the X direction, of the cavity 5C, and projects highly the most at the upper surface 501. In a direction toward an outward side, in the radial direction, of the upper surface 501, an area extending from a peripheral edge of the bottom face portion 51 to the long-diameter side ridgeline portion 52 is an upward inclined surface, and an area extending from the long-diameter side ridgeline portion 52 to the outer peripheral edge 5E is a downward inclined surface. The short-diameter side ridgeline portion 53 is an opening edge, in the Y direction, of the cavity 5C, and projects up to a lower level than the long-diameter side ridgeline portion 52. An area extending from the peripheral edge of the bottom face portion 51 to the short-diameter side ridgeline portion 53 is an upward inclined surface which goes up toward the outward side, in the radial direction, of the upper surface 501. A downward inclined surface and a squish portion 54 are continuous on an outward side, in the radial direction, of the short-diameter side ridgeline portion 53. The squish portion 54 is a half-moon shaped flat surface portion which is provided at an end portion, in the Y direction, of the upper surface 501.

The combustion-chamber structure of the present embodiment is configured such that the crown surface 5H of the piston 5 has a temperature gradient along the radial direction when the mixture in the combustion chamber 6 burns. The above-described temperature gradient is such that the temperature of a central area, in the radial direction, of the crown surface 5H is relatively high, whereas the temperature of an outside area, in the radial direction, of the crown surface 5H is relatively low. Meanwhile, the present combustion-chamber structure is configured such that heat dissipation (heat release) is possible through the piston body 50 so as to suppress the temperature from rising up to a high temperature which may cause preignition in the central area, in the radial direction, of the combustion chamber 6. In order to provide such a combustion-chamber structure, the heat-insulation layer 71 is provided in the central area, in the radial direction, of the upper surface 501 of the piston body 50 according to the present embodiment. The heat-barrier layer 72 is provided such that it perfectly covers the upper surface 501 where the heat-insulation layer 71 is provided. The heat-diffusion layer 73 is provided between the heat-insulation 71 and the heat-barrier layer 72. Since this kind of laminate structure is formed at the upper surface 501, the heat-barrier layer 72 is exposed to the piston crown surface 5H which becomes an exposure face to the combustion chamber 6.

The heat-insulation layer 71 is a circular member having a specified thickness in the Z direction in the top view. Of course, this circular shape is one example, and this layer 71 may has any other shape, such as a polygon. The heat-insulation layer 71 is provided at least in the central area, in the radial direction, of the upper surface 501. FIGS. 3 and 4 show an example in which the heat-insulation layer 71 is located at a position which corresponds to the bottom face portion of the cavity 5C. The heat-insulation layer 71 may be configured to extend up to the upward inclined surface positioned on the outward side, in the radial direction, of the bottom face portion 51, the long-diameter side ridgeline portion 52 and/or the short-diameter side ridgeline portion 53, or a further outward point, in the radial direction, from the long-diameter side ridgeline portion 52 and/or the short-diameter side ridgeline portion 53. The thickness of the heat-insulation layer 71 can be selected from a range of 1-6 mm, for example.

It is preferable that the heat conductivity of the heat-insulation layer 71 be as small as possible from viewpoints of suppressing the heat from getting away (escaping) from the combustion chamber 6 through the piston 5 (suppressing the heat loss), and at least a material having the smaller heat conductivity than the piston body 50 be used. Further, it is preferable that the heat-insulation layer 71 have the volume specific heat which is as large as possible from, i.e., the superior heat-storage performance, from viewpoints of maintaining the central area, in the radial direction, of the crown surface 5H at a properly high temperature.

The heat-barrier layer 72 covers an entire part of the upper surface 501 of the piston body 50 for the suppression of the heat loss through the crown surface 5H. It is preferable that the heat-barrier layer 72 have the smaller heat conductivity than the piston body 50 and the heat-insulation layer from viewpoints of suppression of the heat dissipation from the crown surface 5H. By providing the heat-barrier layer 72, a temperature difference between the combustion gas generated in the combustion chamber 6 and the crown surface 5H can be made properly small and thereby the heat loss can be reduced. Meanwhile, if the heat-barrier layer 72 has the large volume specific heat (heat storage performance) which is the same level as the heat-insulation layer 71, the temperature of not only the central area, in the radial direction, of the crown surface 5H but its outside area may be maintained at a high level, so that it may become difficult to make an effective temperature distribution. Therefore, it is preferable that the heat-barrier layer 72 have the smaller volume specific heat than the heat-insulation layer 71. The thickness of the heat-barrier layer 72 can be selected from a range of 0.03-0.25 mm, for example.

The heat-diffusion layer 73 is provided between the heat-insulation layer 71 and the heat-barrier layer 72 such that its lower surface contacts with the heat-insulation layer 71 and its upper surface contacts with the heat-barrier layer 72. The heat-diffusion layer 73 is a layer which has the function of making the heat stored at the heat-insulation layer 71 escape to the piston body 50 so that the temperature of the crown surface 5H does not increase too much at the arrangement of the heat-insulation layer 71. It is preferable that the heat conductivity of the heat-diffusion layer 73 be as large as possible from viewpoints of immediately making the heat of the heat-insulation layer 71 transfer to the piston body 50. Accordingly, the heat-diffusion layer 73 is configured to have the larger heat conductivity than the heat-insulation layer 71 and the heat-barrier layer 72. The thickness of the heat-diffusion layer 73 can be selected from a range of 1-5 mm, for example. Herein, it is preferable from viewpoints of appropriate heat diffusion that the heat resistance which is represented by "heat conductivity/thickness" be as small as possible. Accordingly, the thickness, in the Z direction, of the heat-diffusion layer 73 is set considering the heat conductivity of a material used.

Referring to FIG. 3B, the heat-diffusion layer 73 has a larger size than the heat-insulation layer 71. That is, the heat-diffusion layer 73 has a side end edge 731 which is positioned on the outward side, in the radial direction, of an outer peripheral edge 711 of the heat-insulation layer 71. Consequently, the heat-diffusion layer 73 comprises an extension portion 732 (contact portion) which extends outwardly, in the radial direction, beyond the outer peripheral edge 711 of the heat-insulation layer 71. The end edge 731 and the extension portion 732 are portions which directly contact with the piston body 50. The heat-diffusion layer 73 makes the heat which has not been insulated (blocked) by the heat-barrier layer 72 transfer to the heat-insulation layer 71. Meanwhile, the heat-diffusion layer 73 receives the heat which has been excessively stored at the heat-insulation layer 71 and makes this heat transfer from the side end edge 731 and the extension portion 732 to the piston body 50.

The heat-insulation layer 71 and the heat-diffusion layer 73 are stored in a recess portion 501R which is formed at the upper surface 501 of the piston body 50. That is, the heat-insulation layer 71 and the heat-diffusion layer 73 are positioned inside the recess portion 501R such that these do not project from the bottom face portion 51 of the cavity 5C. The heat-insulation layer 71 and the heat-diffusion layer 73 can be manufactured by a method that the recess portion 501R is formed at the upper surface 501 previously and then sheets corresponding to the heat-insulation layer 71 and the heat-diffusion layer 73 are inserted with pressure into the recess portion 501R, a method that these layers 71, 73 are welded to the bottom face portion 51 by a cast-in molding, or the like.

A casting of a metal-based material, such as aluminum alloy AC4B (the heat conductivity=96 W/mK, the volume specific heat=2667 kJ/m$^3$K), can be used as a base material of the cylinder block 3 and the cylinder head 4. Further, aluminum alloy AC8A (the heat conductivity=125 W/mK, the volume specific heat=2600 kJ/m$^3$K) can be used as a base material of the piston 5 (piston body 50).

A material which has the smallest heat conductivity and volume specific heat among the structural members of the piston 5 (the piston body 50, the heat-insulation layer 71, the heat-barrier layer 72, and the heat-diffusion layer 73) is selected for the heat-barrier layer 72 which is exposed to the crown surface 5H of the piston 5. That is, the structural material of the heat-barrier layer 72 is selected so that this layer 72 does not diffuse the heat very much and does not store the heat very much. A preferable range of the heat conductivity of the heat-barrier layer 72 is 0.05-1.50 W/mK, and a preferable range of the volume specific heat of the heat-barrier layer 72 is about 500-1500 kJ/m$^3$K.

For example, heat-resistant silicon resin can be exemplified as the material of the heat-barrier layer 72 which meets the above-described requirements. The silicon resin made of three-dimensional polymer having the high branching degree which is represented by methyl silicon resin and methylphenyl silicon resin can be exemplified as the above-described silicon resin, and polyalkylphenylsiloxane or the like are preferably used, for example. This silicon resin may contain microballoon particles, such as Shirasu balloons. The heat-barrier layer 72 can be formed by a coating process in which the above-described silicon resin is coated on the upper surface 501 where the heat-insulation layer 71 and the heat-diffusion layer 73 are formed, for example.

The heat-insulation layer 71 is the layer which does not diffuse the heat very much but store the heat easily. A material which has the larger heat conductivity than the heat-barrier layer 72 but has the extremely-smaller heat conductivity than the piston body 50 is selected for the heat-insulation layer 71 for suppression of the heat diffusion. Further, a material which has the larger volume specific heat and heat resistance than the heat-barrier layer 72 is selected for the heat-insulation layer 71 for the appropriate heat storage performance A preferable range of the heat conductivity of the heat-insulation layer 71 is 0.2-10 W/mK, and a preferable range of the volume specific heat of the heat-insulation layer 71 is about 800-3500 kJ/m$^3$K.

A ceramics material can be exemplified as the material of the heat-insulation layer 71 which meets the above-described requirements, for example. In general, since the ceramics material has the small heat conductivity but has the larger volume specific heat and the superior heat resistance, this material is suitable for the heat-insulation layer 71. Specifically, a preferable ceramics material is zirconia (the heat conductivity=3 W/mK, the volume specific heat=2576 kJ/m$^3$K). Alternatively, the ceramics material, such as silicon nitride, silica, cordierite, or mullite, a porous SUS based material, calcium silicate, or the like can be used as the material of the heat-insulation layer 71 as well.

The heat-diffusion layer 73 makes the heat stored at the heat-insulation layer 71 escape to the piston body 50, and therefore this layer 73 is the layer which easily diffuses the heat. Thus, the heat-diffusion layer 73 has the largest heat conductivity among the structural members of the piston 5. A range of the preferable heat conductivity of the heat-diffusion layer 73 is about 35-600 W/mK. Further, it is preferable that the thickness, in the Z direction, of the heat-diffusion layer 73 be set such that the heat resistance is within a range of $0.002$-$0.06^2$ K/W. A copper-based material (the heat conductivity=400 W/mK, the volume specific heat=3500 kJ/m$^3$K), Corson alloy, beryllium copper, fiber-reinforced aluminum alloy, titanium aluminum, or the like can be used as the material of the heat-diffusion layer 73 which meets the above-described requirements. The above-described copper-based material is particularly preferable because even in a case where the thickness is set at 2 mm, the heat resistance of the heat-diffusion layer 73 can be suppressed at a value of 0.005 m$^2$K/W.

While it is dispensable that the heat-diffusion layer 73 has the contact portion which contacts with the piston body 50, its contract manner is selectable. FIG. 5 is a sectional view of a piston 5-1 according to another embodiment. The heat-insulation layer 71 and the heat-barrier layer 72 of the piston 5-1 shown in FIG. 5 are similar to those of the piston 5 disclosed in FIGS. 3 and 4. However, a heat-diffusion layer 73A of the piston 5-1 is set such that it has the same width size, in the radial direction, as the heat-diffusion layer 71. That is, the outer peripheral edge 711 of the heat-insulation layer 71 and a side end edge 731A of the heat-diffusion layer 73A are located at the same position in the radial direction. This heat-diffusion layer 73A has not have the extension portion 732 of the above-described heat-diffusion layer 73, but the side end edge 731A severs as the connection portion which connects with the piston body 50. That is, the heat of the heat-insulation layer 71 gets away (escapes) to the piston body 50 through the side end edge 731A. However, it is preferable that the extension portion 732 be provided because a contact area between the heat-diffusion layer 73 and the piston body 50 is so enlarged that the heat of the heat-insulation layer 71 can be made to escape to the piston body 50.

Figure 6:
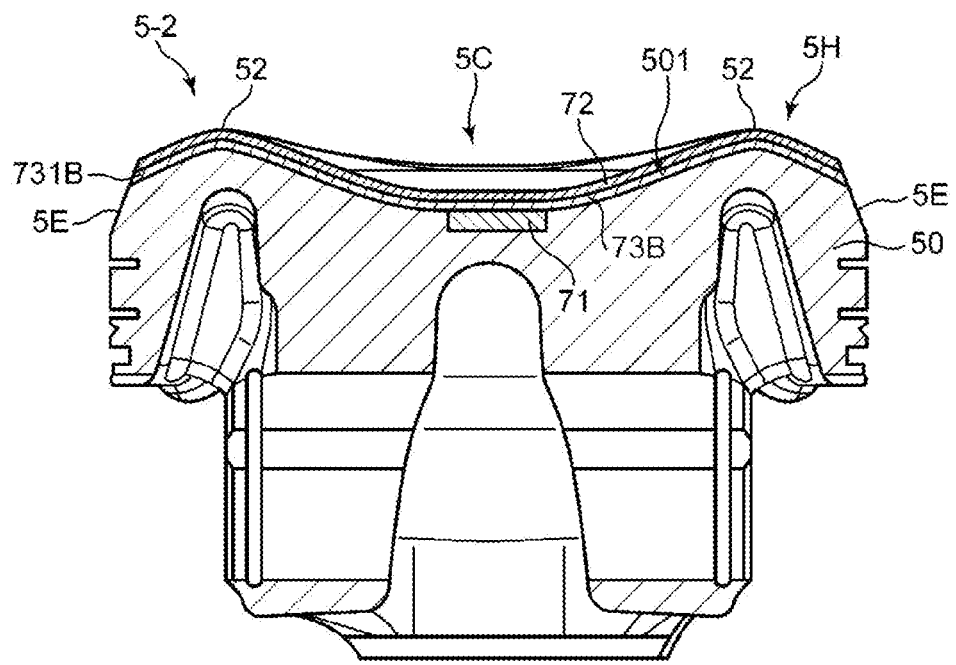
FIG. 6 is a sectional view of a piston according to further another embodiment.

FIG. 6 is a sectional view of a piston 5-2 according to further another embodiment. The heat-insulation layer 71 and the heat-barrier layer 72 of the piston 5-2 are similar to those of the piston 5 shown in FIGS. 3 and 4. Meanwhile, a heat-diffusion layer 73B of the piston 5-2 is set such that it has the same width size, in the radial direction, as the heat-barrier layer 72. That is, a side end edge 731B of the heat-diffusion layer 73B extends up to the outer peripheral edge 5E of the piston body 50. Thereby, an upper surface of the heat-diffusion layer 73B contacts with an entire part of a lower surface of the heat-barrier layer 72. Further, a lower surface of the heat-diffusion layer 73B contacts with an entire part of the upper surface 501 of the piston body 50 except an arrangement portion of the heat-insulation layer 71. An contact are of the heat-diffusion layer 73B with the piston body 50 can be made maximum, so that the heat of the heat-insulation layer 73B can be distributed to the entire part of the upper surface 501 widely. Accordingly, the heat of the heat-insulation layer 71 can be made to escape to the piston body 50 further more.

FIG. 7 shows a preferred material selection example of the piston body 50, the heat-insulation layer 71, the heat-barrier layer 72, and the heat-diffusion layer 73 of the piston 5. FIG. 7 shows the heat conductivity $\lambda$, the volume specific heat $\rho c$, the heat diffusivity ($\lambda/\rho c$), the Z-directional thickness t, the heat resistance ($t/\lambda$), and the heat permeability ($\sqrt{\lambda \rho c}$) of each of these materials. Herein, a right-side small column of the heat diffusivity shows each value of the respective layers in a case where the heat diffusivity of the heat-barrier layer 72 is considered as "1".

[Significance of Heat-Insulation Layer]

Figure 8:
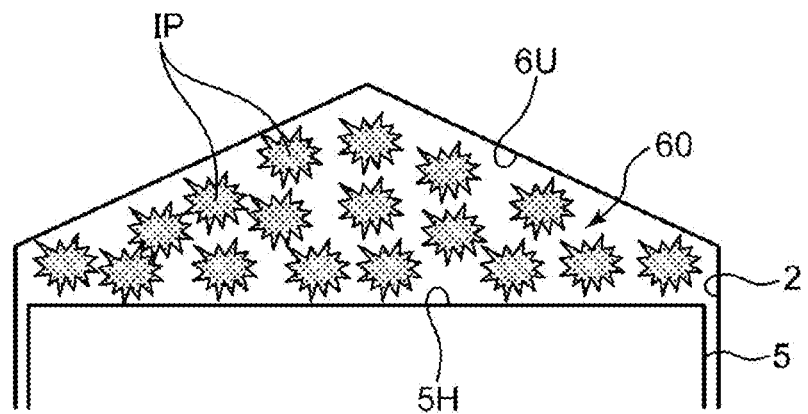
FIG. 8 is a schematic diagram explaining a combustion manner of a homogeneous-charge compression-ignition combustion engine.

Subsequently, the significance (performance) of the heat-insulation layer 71 and the heat-diffusion layer 73 which are described above will be described. Herein, this will be described by referring to the engine which is capable of performing the homogeneous-charge compression-ignition combustion. FIG. 8 is a schematic diagram explaining a combustion manner of the homogeneous-charge compression-ignition combustion engine. In FIG. 8, a pent roof type of combustion chamber 60 is schematically shown and illustration of the cavity 5C is omitted.

In the homogeneous-charge compression-ignition combustion engine, the mixture of the fuel and the air is self-ignited in the combustion chamber 60 by being compressed by the piston 5. Accordingly, the combustion does not start from a compulsory ignition point like the spark-ignition combustion, but, as shown in FIG. 8, plural ignition points IP occur at various places in the combustion chamber 60 and thereby the combustion (burning) of the mixture starts concurrently (at one time). This concurrent combustion causes a rapid increase of the pressure inside the combustion chamber 60 (cylinder internal pressure). Thereby, a large combustion noise is caused and a large load is applied to various engine-mechanism parts, such as a connecting portion between the connecting rod 8 and the crankshaft 7. These may become hindering factors in practically applying the homogeneous-charge compression-ignition combustion engine. Moreover, since flames are generated instantly in the combustion chamber 6 according to this concurrent combustion, the heat dissipation (heat loss) through the above-described combustion-chamber wall surface, particularly the heat loss through the inner wall of the cylinder 2 which has a relatively low temperature, become improperly large. Accordingly, the heat efficiency of the engine may be deteriorated.

It may be considered that a uniform temperature distribution inside the combustion chamber 60 (combustion-chamber wall surface) causes the above-described scattering of the ignition points IP in the combustion chamber 60. That is, since the temperature is uniform (homogeneous) inside the combustion chamber 60, once the mixture is compressed in the engine compression stroke and this compression state reaches a specified condition, an ignition condition is established at every places in the combustion chamber 60. In view of this matter, the present embodiment is configured such that the temperature gradient is actively formed in the radial direction of the combustion chamber 60, i.e., at the crown surface 5H of the piston 5. Specifically, the temperature distribution is provided such that the temperature of the central area, in the radial direction, of the crown surface 5H is relatively high, whereas the temperature of the outside area, in the radial direction, of the crown surface 5H is relatively low.

Figure 9:
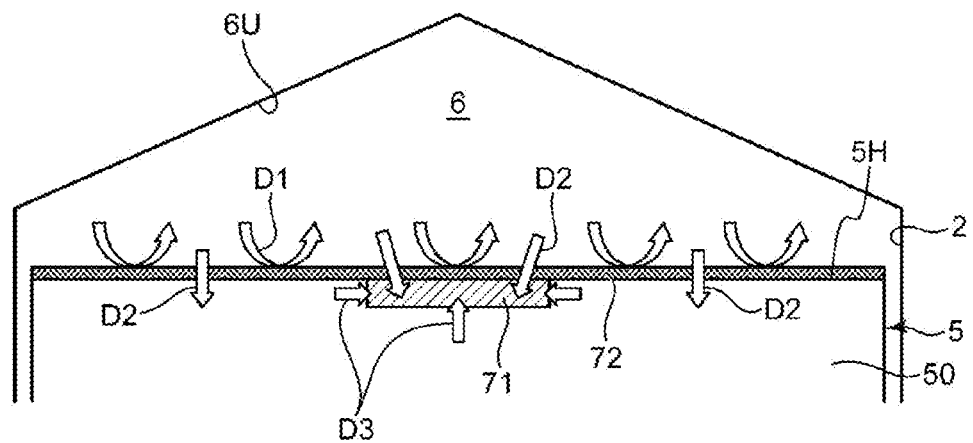
FIG. 9 is a schematic diagram explaining heat-insulation and heat-storage operations in a combustion-chamber structure of a comparative example.

FIG. 9 is a schematic diagram explaining heat-insulation and heat-storage operations in the combustion-chamber structure in which the piston 5 comprising the heat-barrier layer 72 and the heat-insulation layer 71 is used. The heat-barrier layer 72 has the extremely small heat conductivity as described above, so that its temperature changes according to the internal temperature of the combustion chamber 6. Accordingly, the temperature difference between the combustion gas inside the combustion chamber 6 and the crown surface 5H is made small, whereby the heat transfer to the piston body 50 can be suppressed to a certain degree. That is, as shown by an arrow D1 in FIG. 9, the heat can be prevented from escaping from the combustion chamber 6 through the crown surface 5H. Thereby, the heat loss can be reduced. Herein, since the heat transfer cannot be insulated (blocked) perfectly by the heat-barrier layer 72, the heat is made to transfer to a certain degree as shown by an arrow D2 in FIG. 9.

An area of the piston 5 where the heat-insulation layer 71 is provided has the small heat conductivity. That is, the heat-insulation layer 71 blocks the heat transfer from the combustion chamber 6 to the piston 5, thereby suppressing the heat dissipation. Meanwhile, in another area where the heat-insulation layer 71 is not provided, the heat transfer from the combustion chamber 6 to the piston 5 is generated according to the heat conductivity of the piston 5. While the above-described heat transfer is suppressed to a certain degree by providing the heat-barrier layer 72, the larger heat transfer than the arrangement area of the heat-insulation layer 71 is generated. Further, the heat-insulation layer 71 of the present embodiment is made of the material having the larger volume specific heat, thereby performing the superior heat storage. Accordingly, the heat passed through the heat-barrier layer 72 (the arrow D2) and the heat around there (the arrow D3) are stored at the heat-insulation layer 71.

Then, the heat-insulation layer 71 where the heat has been stored comes to heat the above-positioned heat-barrier layer 72. Accordingly, the temperature of the central area, in the radial direction, of the crown surface 5H where the heat-insulation layer 71 is provided can be maintained at the higher one, compared to the temperature of its outside area. This temperature gradient is formed in the radial direction, so that the homogenous-charge compression-ignition combustion in the combustion chamber 6 can be configured such that the combustion (burning) of the mixture changes (moves) from an inside space to an outside space, in the radial direction, of the combustion chamber 6. That is, the concurrent ignition-and-combustion at the plural places in the combustion chamber 60, which is shown in FIG. 8, does not happen, but there occurs a slow combustion where the mixture burns gradually from the central area, in the radial direction, of the combustion chamber 6 to the outside area, in the radial direction, of the combustion chamber 6. Accordingly, in the homogeneous-charge compression-ignition combustion, the combustion noise and the mechanical load can be reduced and the heat loss can be improved.

[Significance of Heat-Diffusion Layer]

Figure 10:
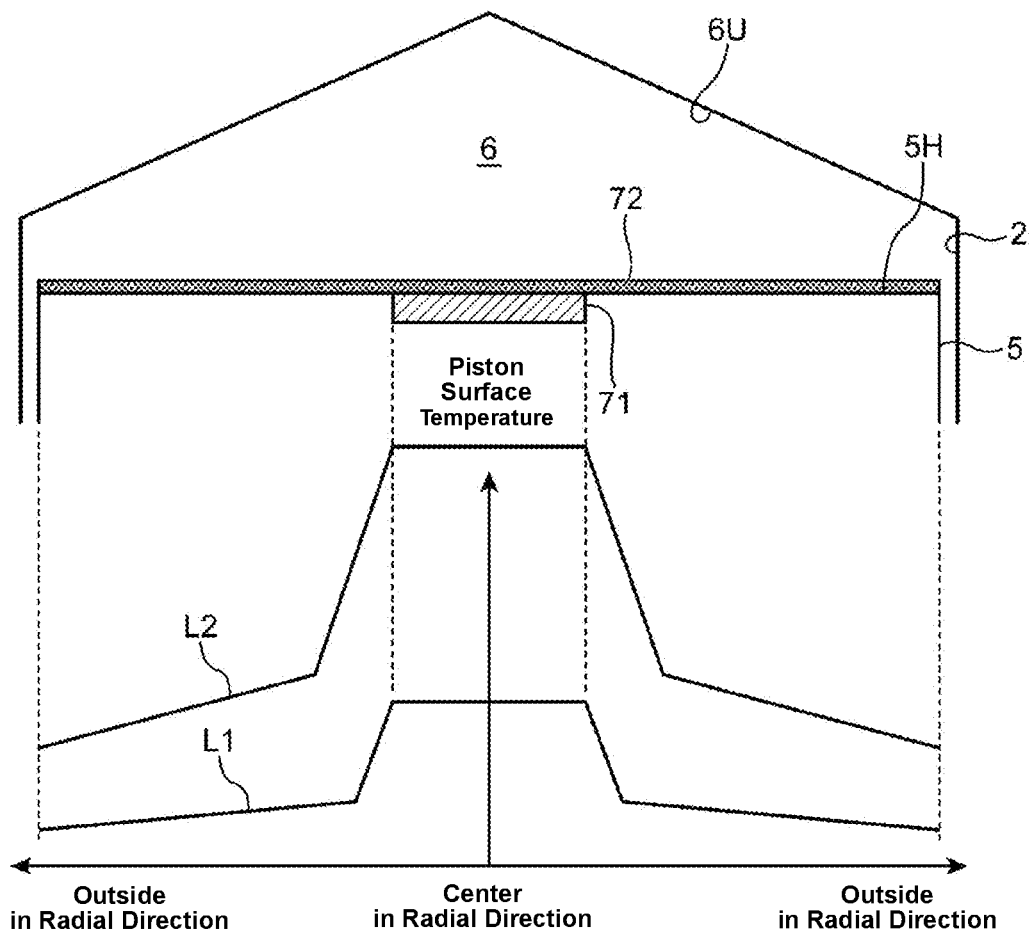
FIG. 10 is a schematic diagram explaining a piston-surface temperature distribution in the combustion-chamber structure of the comparative example.

It can be prevented by providing the heat-diffusion layer 73 between the heat-insulation layer 71 and the heat-barrier layer 72 that the temperature of the arrangement area of the heat-insulation layer 71 on the crown surface 5H increases excessively. FIG. 10 is a schematic diagram explaining the temperature distribution of the crown surface 5H (piston-surface temperature distribution) according to a comparative example. A combustion-chamber of the comparative example is substantially the same as that of the above-described embodiment in a structure in which the heat-insulation layer 71 is provided in the central area, in the radial direction, of the crown surface 5H and the entire part of the crown surface 5H is covered with the heat-barrier layer 72, but different from that of the above-described embodiment in a structure in which the heat-diffusion layer 73 does not exist.

A temperature distribution L1 of FIG. 10 shows a piston-surface temperature in the low-load engine operation. As described above, the engine body 1 of the present embodiment performs the homogeneous-charge compression-ignition combustion in which a lean mixture is used in the low-load engine operation. Since the amount of fuel injection from the injector 18 is relatively small in the low-load engine operation, the temperature of the combustion gas in the combustion chamber 6 is relatively low. Accordingly, the temperature of the piston surface is low as a whole as well. Herein, since the heat-insulation layer 71 is provided in the central area, in the radial direction, of the crown surface 5H, the piston-surface temperature of the above-described central area becomes high as described above. Accordingly, the temperature distribution L1 is configured such that the central area, in the radial direction, which corresponds to the arrangement area of the heat-insulation layer 71 has the high temperature and the outside area, in the radial direction, which corresponds to the non-arrangement area of the heat-insulation layer 71 has the low temperature.

A temperature distribution L2 of FIG. 10 shows the piston-surface temperature in the middle/high-load engine operation. The engine body 1 performs the homogenous-charge compression-ignition combustion using the lean mixture in the middle-load engine operation, and performs the spark-ignition combustion with an air-fuel ratio: $\lambda=1$ in the high-load engine operation. A distribution tendency of the temperature distribution L2 is the same as the temperature distribution L1, in which the temperature in the central area, in the radial direction, of the piston surface is high and the temperature in the outside area, in the radial direction, of the piston surface is low. However, since the amount of fuel injection becomes relatively large in the middle/high-load engine operation, the temperature of the combustion gas inside the combustion chamber 6 becomes relatively high. Accordingly, the piston surface temperature becomes high as a whole as well, and the heat-insulation layer 71 comes to store the high-temperature heat as well. Thus, the heat-barrier layer 72 is heated by this heat-insulation layer 71, so that the temperature distribution L2 shows the distribution in which the central area, in the radial direction, of the piston surface where the heat-insulation layer 71 is provided has a particularly high temperature.

Figure 11:
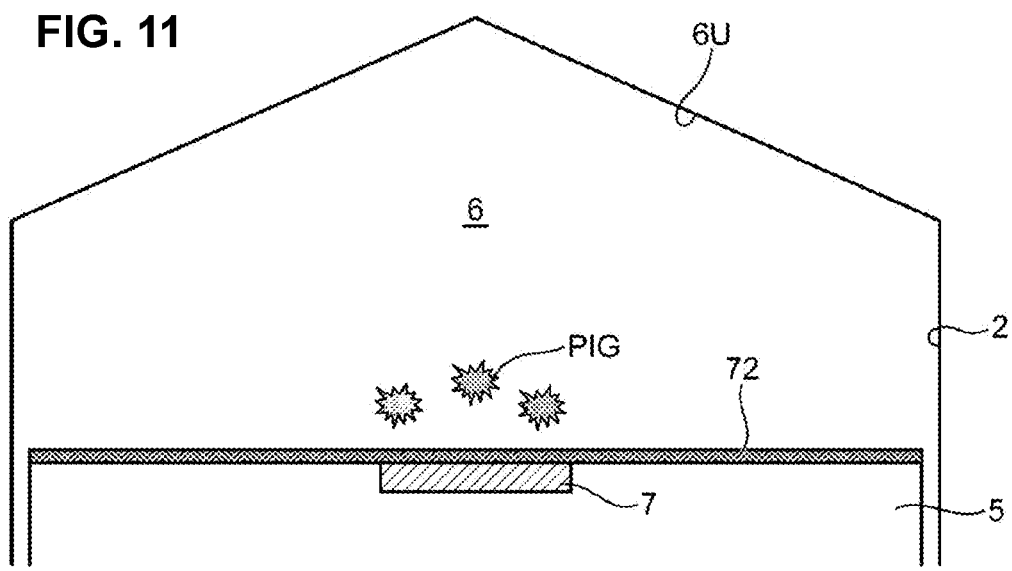
FIG. 11 is an explanatory diagram of preignition which may occur in the combustion-chamber structure of the comparative example.

FIG. 11 is an explanatory diagram showing a phenomenon which may occur in the middle/high-load engine operation in the combustion-chamber structure of the comparative example. In a case where the central area, in the radial direction, of the crown surface 5H (heat-barrier layer 72) comes to have the extremely high temperature like the temperature distribution L2 of FIG. 10, the cylinder internal temperature is made excessively high. Thereby, when the temperature of the air taken in into the combustion chamber 6 in the engine intake stroke becomes higher and then this heated air is compressed in the engine compression stroke, preignitions PIG may occur. That is, there may occur the phenomenon in which part of the mixture has been ignited at an earlier timing than a normal compression-ignition timing. In this case, an improper torque fluctuation or output decrease may be caused.

Figure 12A:
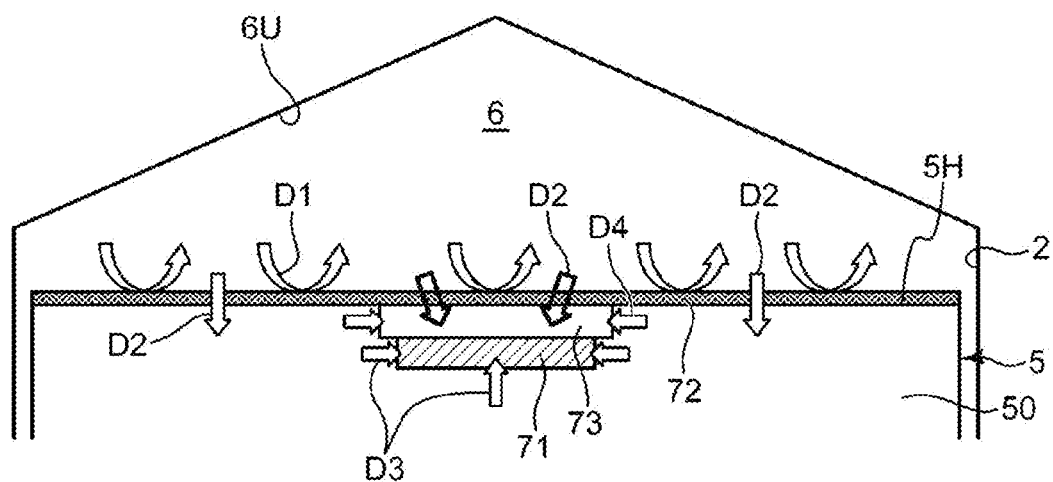
FIGS. 12A and 12B are schematic diagrams explaining behaviors (operations) of heat in the combustion-chamber structure of the present embodiment.
Figure 12B:
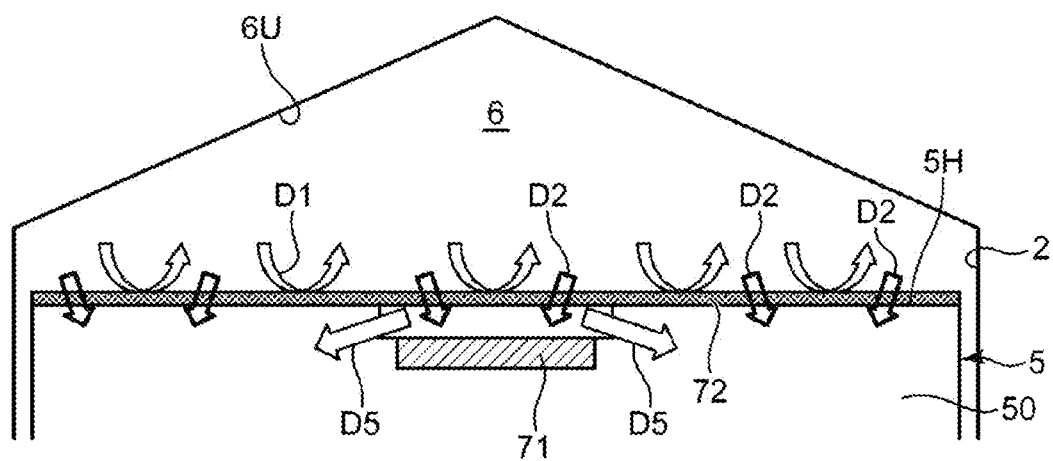

FIGS. 12A and 12B are schematic diagrams explaining behaviors (operations) of the heat in the combustion-chamber structure of the present embodiment. FIG. 12A shows the behavior of the heat in the low-load engine operation. Similarly to the comparative example, the heat-barrier layer 72 prevents the heat from escaping from the combustion chamber 6 through the crown surface 5H (arrow D1). Herein, since the heat-barrier layer 72 cannot block the heat transfer perfectly, the heat may pass through to a certain degree (arrow D2). This heat having passed through comes into the heat-diffusion layer 73, and since the heat-diffusion layer 73 has the high heat conductivity, the heat is made to transfer to the heat-insulation layer 71. Further, the heat-diffusion layer 73 makes the heat of the piston body 50 transfer to the heat-insulation layer 71 (arrow D4). The heat of the piston body 50 transfers to the heat-insulation layer 71 directly as well (arrow D3). The heat-insulation layer 71 stores this heat, and consequently, the temperature distribution in which the temperature of the central area, in the radial direction, of the crown surface 5H which corresponds to the arrangement area of the heat-insulation layer 71 is high, whereas the temperature of the outside area, in the radial direction, of the crown surface 5H which corresponds to the non-arrangement area of the heat-insulation layer 71 is low is formed.

FIG. 12B shows the behavior of the heat in the middle/high-load engine operation. In the middle/high-load engine operation, the combustion-gas temperature in the combustion chamber 6 becomes high and the heat-barrier layer 72 blocks (arrow D1), but the heat having higher temperature and larger heat capacity passes through the heat-barrier layer 72 (arrow D2). At the arrangement position of the heat-insulation layer 71, the heat having passed through the heat-barrier layer 72 comes into the heat-diffusion layer 73 and transfers to the heat-insulation layer 71. Accordingly, the temperature of the heat-insulation layer 71 becomes high. However, when the temperature of the heat-insulation layer 71 becomes higher than that of the piston body 50, the heat-diffusion layer 73 makes the heat of the heat-insulation layer 71 transfer to the piston body 50 (arrow D5). That is, the heat-diffusion layer 73 performs the function of heat dissipation of the heat of the heat-insulation layer 71 to the piston body 50. Thereby, the temperature of the central area, in the radial direction, of the crown surface 5H which corresponds to the arrangement area of the heat-insulation layer 71 can be prevented from becoming excessively high.

Figure 13:
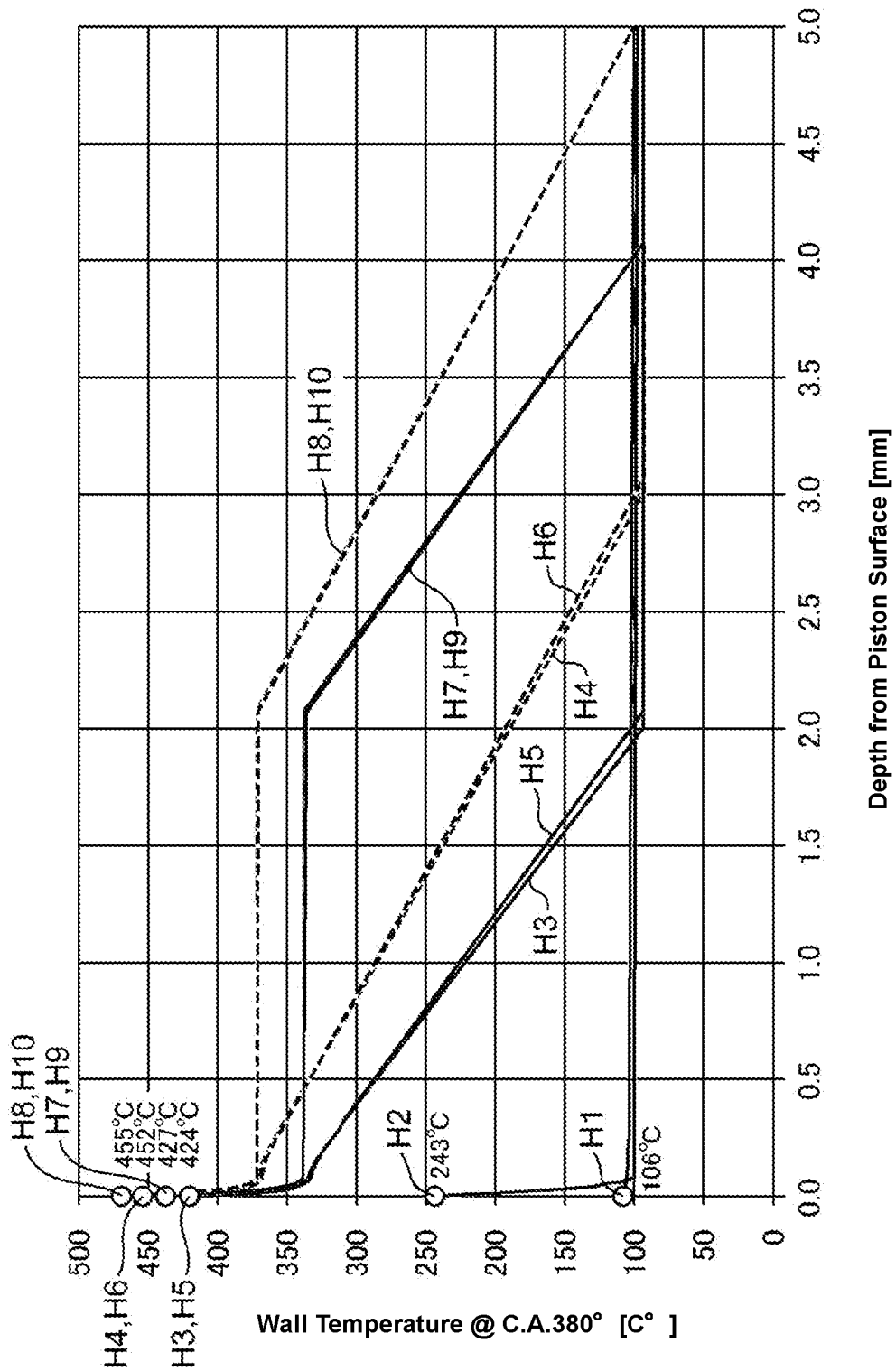
FIG. 13 is a graph showing relationships between the depth from the piston surface (piston crown surface) and the wall temperature.

FIG. 13 is a graph showing relationships between the depth from the piston surface (crown surface 5H) and the wall temperature. The wall temperature at a point which is 0 mm depth from the piston surface is the wall temperature of the crown surface 5H, and respective wall temperatures of the central areas, in the radial direction, of temperature characteristics H1-H10 based on the various kinds of combustion-chamber structure are plotted. The graph of FIG. 13 shows that in the low-load engine operation, even if the heat-diffusion layer 73 is provided between the heat-insulation layer 71 and the heat-barrier layer 72, the temperature of the central area, in the radial direction, of the crown surface 5H can be made high similarly to a case where the heat-diffusion layer 73 is not provided (FIG. 10). Herein, measuring conditions are that a compression ratio of the engine body 1 is 17, an engine speed is 2000 rpm, and the engine load is 1/4.

The temperature characteristic H1 (106° C.) of FIG. 13 is the characteristic of a piston which is not provided with the heat-insulation layer 71, the heat-barrier layer 72, and the heat-diffusion layer 73 (an upper surface 501 of the piston body 50 is exposed). The temperature characteristic H2 (243° C.) of FIG. 13 is the characteristic of a piston which is provided with the heat-barrier layer 72 having a thickness of 75 μm on the upper surface 501 only. The wall temperature of these temperature characteristics H1, H2 is low, so that it is apparent that the temperature distribution in which the temperature of the central area, in the radial direction, of the crown surface 5H does not become high in the low-load engine operation can be provided.

The temperature characteristics H3, H4 are the characteristics of a case where the heat-insulation layer 71 is provided on the upper surface 501 only. The temperature characteristic H3 shows a case where the thickness of the heat-insulation layer 71 is 2 mm, and the temperature characteristic H4 shows a case where the thickness of the heat-insulation layer 71 is 3 mm. The temperature characteristics H5, H6 are the characteristics of a case where the heat-insulation layer 71 and the heat-barrier layer 72 are provided on the upper surface 501 (a structure of the comparative example shown in FIG. 9). The temperature characteristic H5 shows a case where the thickness of the heat-barrier layer 72 is 75 μm and the thickness of the heat-insulation layer 71 is 2 mm, and the temperature characteristic H6 shows a case where the thickness of the heat-barrier layer 72 is 75 μm and the thickness of the heat-insulation layer 71 is 3 mm. The wall temperature of the temperature characteristics H3, H5 is 424° C. and the wall temperature of the temperature characteristics H4, H6 is 452° C., so that it is apparent that the temperature distribution in which the temperature of the central area, in the radial direction, of the crown surface 5H becomes sufficiently high in the low-load engine operation can be provided.

The temperature characteristics H7-H10 are the characteristics of the piston according to the present embodiment where the heat-insulation layer 71, the heat-barrier layer 72, and the heat-diffusion layer 73 are provided on the upper surface 501. The temperature characteristic H7 shows a case where the thickness of the heat-barrier layer 72 is 75 μm, the thickness of the heat-insulation layer 71 is 2 mm, and the heat-diffusion layer 73 is made of the aluminum alloy having the thickness of 2 mm. The temperature characteristic H8 is substantially the same as the temperature characteristic H8 except the heat-insulation layer 71 having the thickness of 3 mm. The temperature characteristic H9 shows a case where the thickness of the heat-barrier layer 72 is 75 μm, the thickness of the heat-insulation layer 71 is 2 mm, and the heat-diffusion layer 73 is made of the SUS based material having the thickness of 2 mm. The temperature characteristic H10 is substantially the same as the temperature characteristic H9 except the heat-insulation layer 71 having the thickness of 3 mm.

The wall temperature of the temperature characteristics H7, H9 (the thickness of the heat-insulation layer 71 is 2 mm) is 427° C. and the wall temperature of the temperature characteristics H8, H10 (the thickness of the heat-insulation layer 71 is 2 mm) is 455° C. The wall temperature of the temperature characteristics H7, H9 is nearly equal to the wall temperature of the temperature characteristics H3, H5 (424° C.) of the case where the thickness of the heat-insulation layer 71 is 2 mm. Further, the wall temperature of the temperature characteristics H8, H10 is nearly equal to the wall temperature of the temperature characteristics H4, H6 (452° C.) of the case where the thickness of the heat-insulation layer 71 is 3 mm. Accordingly, even in the case where the heat-diffusion layer 73 is provided between the heat-insulation layer 71 and the heat-barrier layer 72, the temperature distribution in which the temperature of the central area, in the radial direction, of the crown surface 5H is sufficiently high in the low-load engine operation can be provided.

Figure 14:
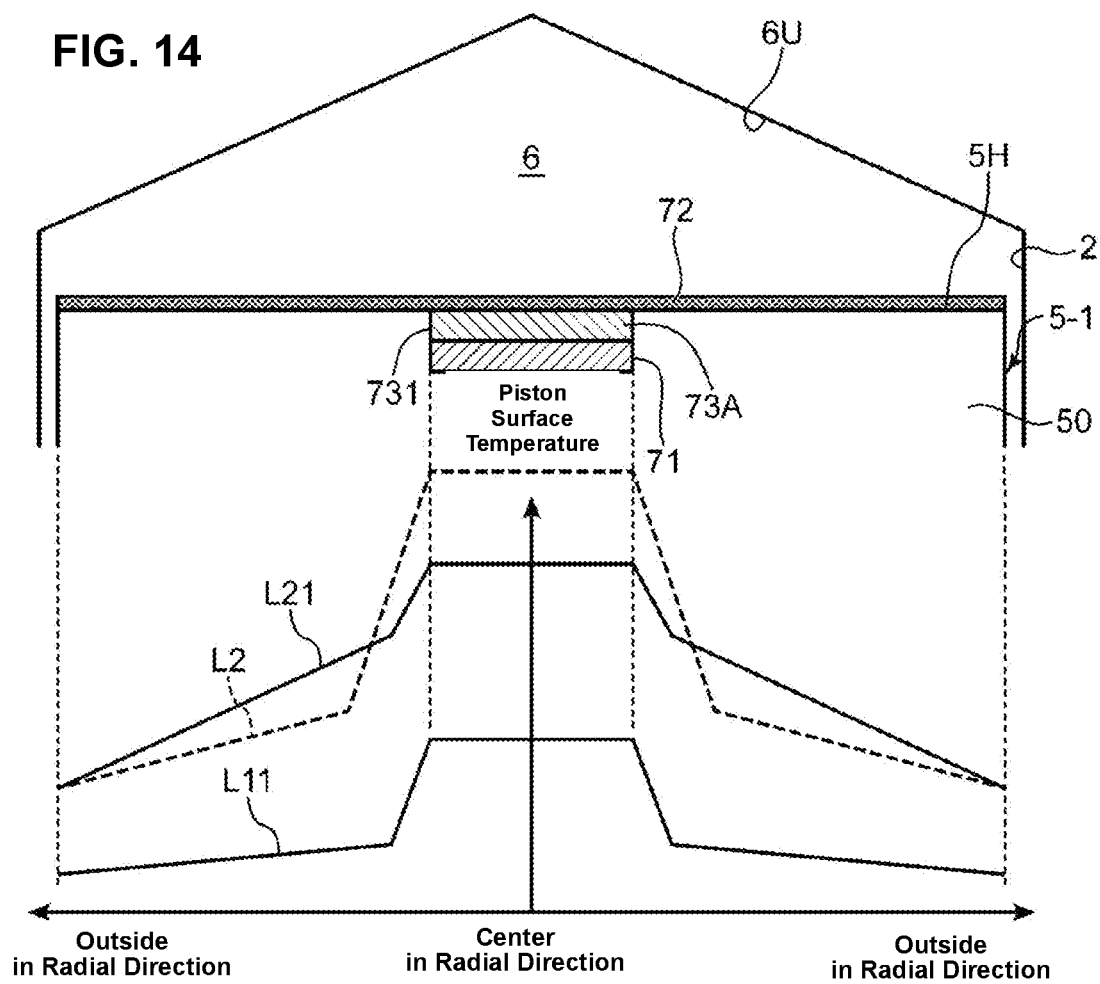
FIG. 14 is a schematic diagram explaining the piston-surface temperature distribution in the combustion-chamber structure of the present embodiment.
Figure 15:
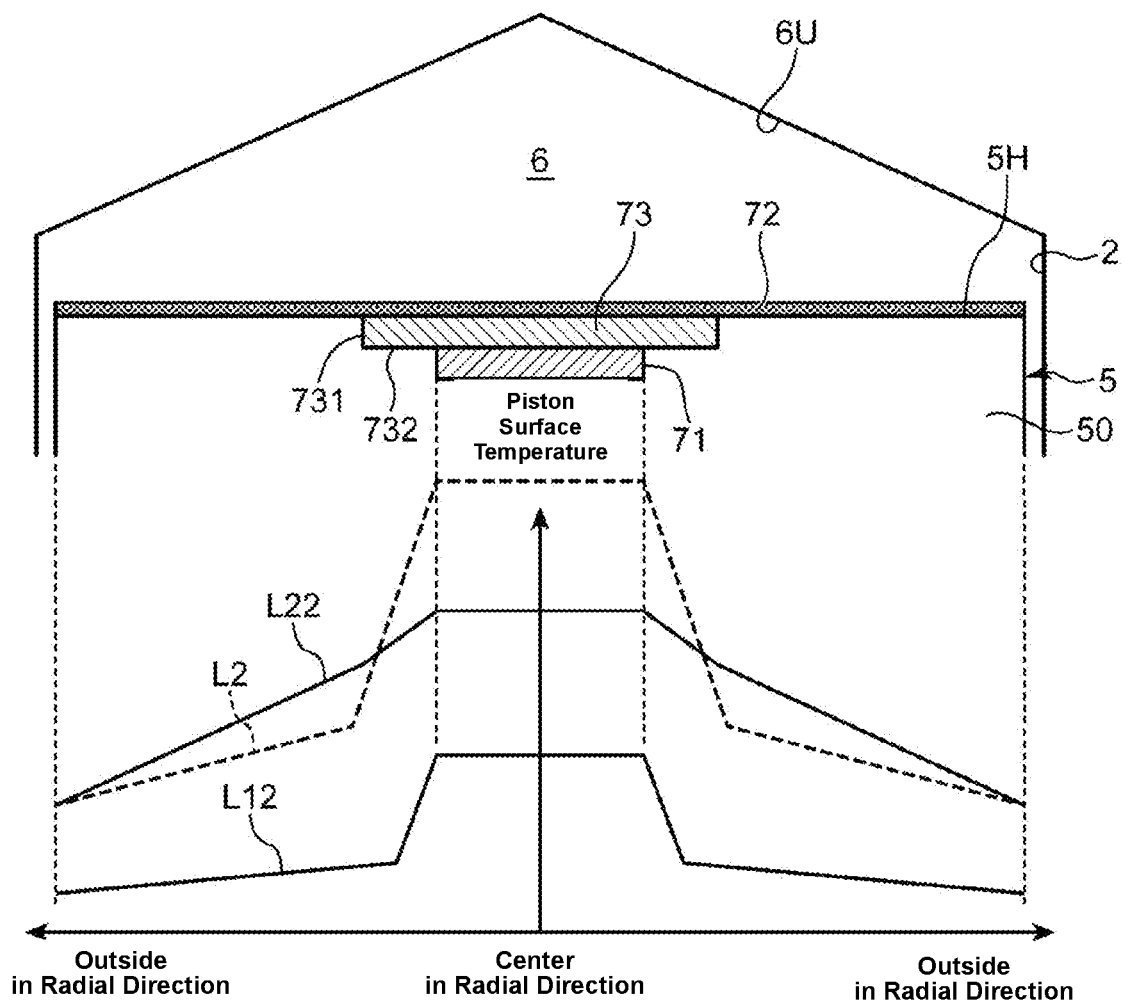
FIG. 15 is a schematic diagram explaining the piston-surface temperature distribution in the combustion-chamber structure of the present embodiment.
Figure 16:
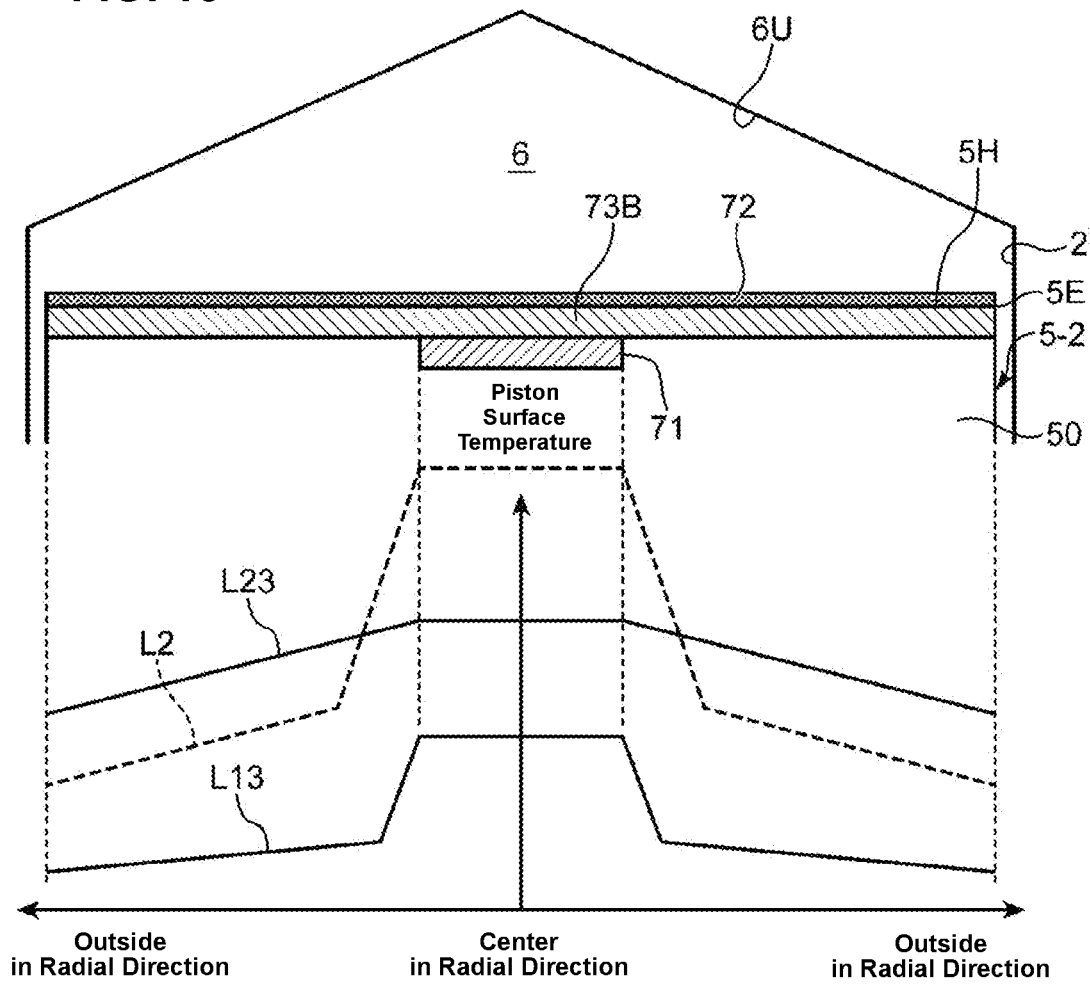
FIG. 16 is a schematic diagram explaining the piston-surface temperature distribution in the combustion-chamber structure of the present embodiment.

FIGS. 14-16 are schematic diagrams for explaining the piston-surface temperature distributions in the combustion-chamber structures of the present embodiment. The combustion-chamber structures shown in FIGS. 14-16 show examples in which these structures have a common structure in which the heat-insulation layer 71 is provided at the central area, in the radial direction, of the crown surface 5H and the entire part of the crown surface 5H is covered with the heat-barrier layer 72, whereas these structures are different from each other in a radial-direction width of the heat-diffusion layer 73.

FIG. 14 is the combustion-chamber structure which corresponds to the piston 5-1 shown in FIG. 5, and the radial-direction width of the heat-diffusion layer 73A has the same size as the heat-insulation layer 71. In this embodiment, as described above, the heat of the heat-insulation layer 71 is made to escape from the side end edge 731A of the heat-diffusion layer 73 to the piston body 50. A temperature distribution L11 shown in FIG. 14 shows a surface temperature (the temperature of the crown surface 5H) of the piston 5-1 in the low-load engine operation. This temperature distribution is equivalent to the temperature distribution L1 which is shown in FIG. 10 as the comparative example. The temperature distribution L11 is configured such that the temperature of the central area, in the radial direction, of the crown surface 5H which corresponds to the arrangement area of the heat-insulation layer 71 is high and the temperature of the outside area, in the radial direction, of the crown surface 5H which corresponds to the non-arrangement area of the heat-insulation layer 71 is low. Accordingly, the slow combustion where the mixture burns gradually from the central area, in the radial direction, of the combustion chamber 6 to the outside area, in the radial direction, of the combustion chamber 6 can be made to occur in the low-load engine operation.

The temperature distribution L21 of FIG. 14 shows the surface temperature of the piston 5-1 in the middle/high-load engine operation. The temperature distribution L2 of the comparative example in the middle/high-load engine operation which is shown by a dotted line is added for comparison. Since the temperature of the combustion gas inside the combustion chamber 6 becomes relatively high in the middle/high-load engine operation, the piston surface temperature of the temperature distribution L21 becomes relatively high as a whole compared to the temperature distribution L11 of the low-load engine operation.

However, the piston surface temperature of the central area, in the radial direction, in the temperature distribution L21 is considerably lowered compared to the temperature distribution L2 of the comparative example. This is because the heat-diffusion layer 73 makes the heat stored at the heat-insulation layer 71 escape to the piston body 50. A heating degree of the heat-insulation layer 72 positioned right above the heat-insulation layer 71 is decreased by the above-described heat-escaping (heat dissipation) caused by the heat-diffusion layer 73, so that the piston surface temperature lowers. Herein, the piston surface temperature of the outside area, in the radial direction, in the temperature distribution L21 increases slightly, compared to that in the temperature distribution L2 of the comparative example, because of the above-described heat dissipation to the piston body 50. However, it can be considered that the surface temperature of the entire part of the crown surface 5H in the temperature distribution L21 decreases more than that in the temperature distribution L2 of the comparative example. Accordingly, the intake air is not heated so excessively that the above-described preignition can be suppressed from occurring.

FIG. 15 shows the combustion chamber which corresponds to the piston 5 shown in FIGS. 3 and 4, in which the heat-diffusion layer 73 has a slightly larger size than the heat-insulation layer 71. In this embodiment, as described above, the heat of the heat-insulation layer 71 is made to escape from the side end edge 731 and the extension portion 732 of the heat-diffusion layer 73 to the piston body 50. The temperature distribution L12 shown in FIG. 15 shows the surface temperature of the piston 5 in the low-load engine operation. This temperature distribution L12 is equivalent to the temperature distribution L11 shown in FIG. 14, in which the temperature of the central area, in the radial direction, is high and the temperature of the outside area, in the radial direction, is low.

The temperature distribution L22 shown in FIG. 15 shows the surface temperature of the piston 5 in the middle/high-load engine operation. Herein, the temperature distribution L2 of the comparative example which is shown by a dotted line is added as well. The piston surface temperature of the central area, in the radial direction, in the temperature distribution L22 is considerably lowered compared to the temperature distribution L2 of the comparative example. Further, this piston surface temperature is also lowered compared to the temperature distribution L21 shown in FIG. 14. This is because the heat-diffusion layer 73 is provided with not only the side end edge 731 but the extension portion 732 as the contact surface with the piston body 50, so that the much more heat which has been stored at the heat-insulation layer 71 is made to escape to the piston body 50.

FIG. 16 shows the combustion-chamber structure which corresponds to the piston 5-2 shown in FIG. 6, in which the radial-direction width of the heat-diffusion layer 73B is the same as that of the heat-barrier layer 72. In this embodiment, since the heat-diffusion layer 73B contacts with the piston body 50 except the arrangement portion of the heat-insulation layer 71, the heat of the heat-insulation layer 71 is made to escape to the entire area of the piston body 50. The temperature distribution L13 shown in FIG. 16 shows the surface temperature of the piston 5-2 in the low-load engine operation. This temperature distribution L13 is equivalent to the temperature distributions L11, L12 shown in FIGS. 14 and 15, in which the temperature of the central area, in the radial direction, is high and the temperature of the outside area, in the radial direction, is low.

The temperature distribution L23 shown in FIG. 16 shows the surface temperature of the piston 5-2 in the middle/high-load engine operation. Herein, the temperature distribution L2 of the comparative example which is shown by a dotted line is added as well. The piston surface temperature of the central area, in the radial direction, in the temperature distribution L23 is considerably lowered compared to the temperature distribution L2 of the comparative example. Further, this piston surface temperature is also lowered compared to the temperature distributions L21, L22 shown in FIGS. 14 and 15. This is because the heat stored at the heat-insulation layer 71 is made to escape to the entire area of the piston body 50 except the arrangement portion of the heat-insulation layer 71.

As described above, the piston surface temperature can be made to have the temperature distribution which is suitable for the slow combustion in the low-load engine operation by any of the combustion-chamber structures of the present embodiment. Meanwhile, it can be prevented in the middle/high-load engine operation that the piston surface temperature of the central area, in the radial direction, increases excessively. Accordingly, the increase of the cylinder internal temperature which may cause the preignitions PIG (FIG. 11) can be prevented from occurring.

[Embodiments with Oil-Jet Cooling]

Figure 17A:
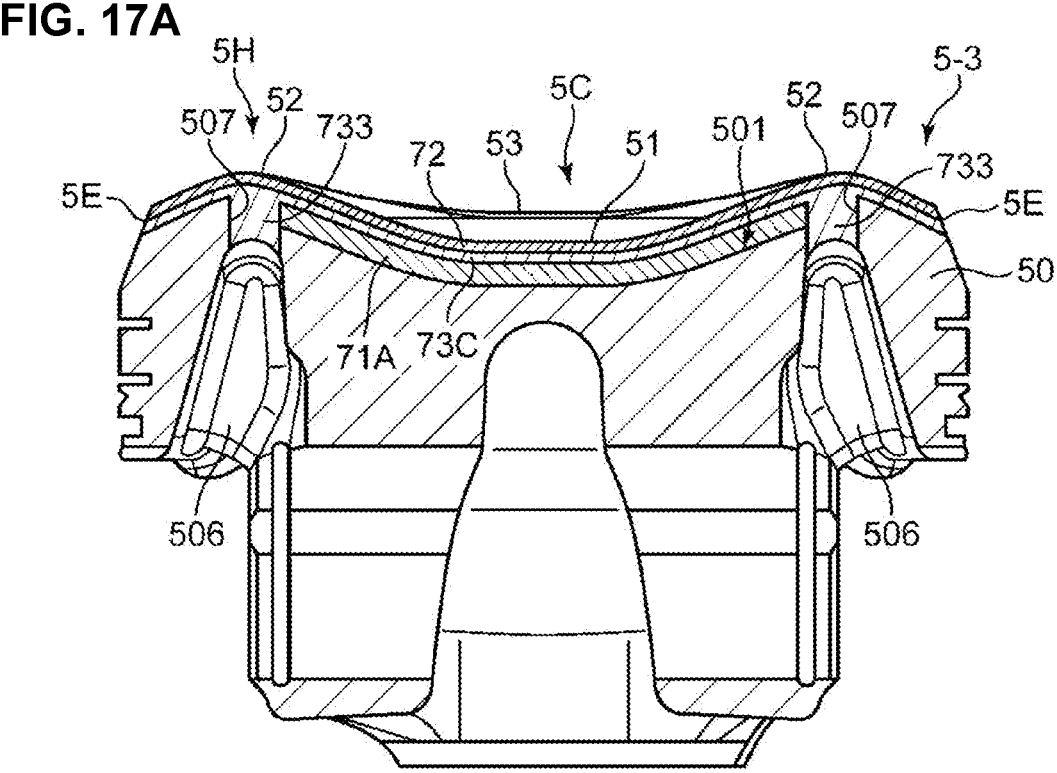
FIG. 17A is a sectional view of the piston which shows an embodiment in a case where oil-jet cooling is applied.

Other embodiments of the present invention will be described. FIG. 17A is a sectional view of the piston 5-3 which shows another embodiment in a case where oil-jet cooling is applied. The piston body 50 of the piston 5-3 comprises a pair of openings 507 which are provided to be connected to a pair of cooling recess portions 506, respectively. A pair of penetration holes which penetrate the piston body 50 in the cylinder axial direction are provided by connection of the cooling recess portion 506 and the opening 507.

A heat-insulation layer 71A is provided on the upper surface 501 of the piston body 50 in an area between the pair of openings 507. The opening 507 is provided at the long-diameter side ridgeline portion 52 of the cavity 5C. Accordingly, the heat-insulation layer 71A is provided at a position corresponding to the arrangement position of the cavity 5C. A heat-diffusion layer 73C is provided to cover the entire area of the upper surface 501. Further, the heat-diffusion layer 73C comprises a seal portion 733 which seals the opening 507. The seal portion 733 is configured to seal a part of the above-described penetration hole which is formed by the cooling recess portion 506 and the opening 507 near the upper surface 501 of the piston body 50. The heat-insulation layer 72 is provided to cover an entire area, in the radial direction, of the heat-diffusion layer 73C.

Figure 17B:
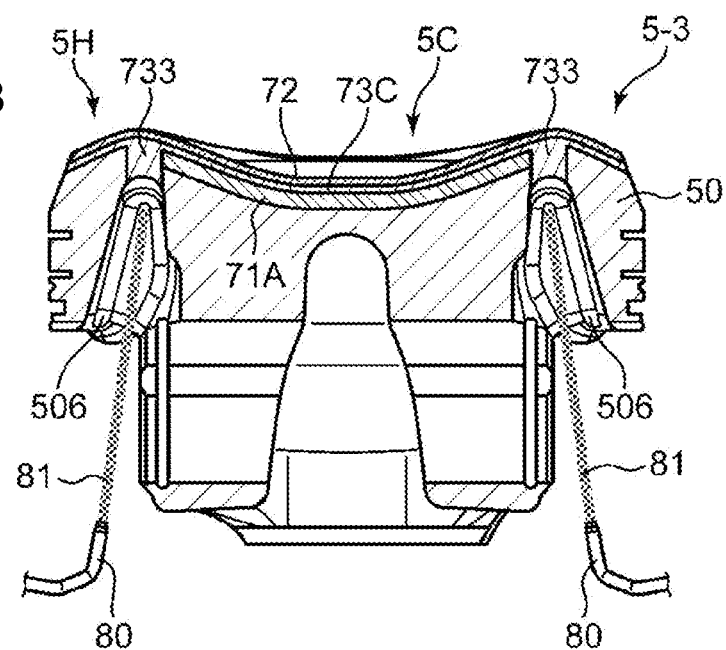
FIG. 17B is a sectional view showing a state where oil is injected to the piston.

FIG. 17B is a sectional view showing a state where cooling oil 81 is injected to a piston 5-3. An oil jet nozzle 80 (oil jet device) to inject the cooling oil 81 is arranged below the piston 5-3. The oil jet nozzle 80 injects the cooling oil 81 toward the seal portion 733 of the heat-diffusion layer 73C from below the cooling recess portion 506 (penetration hole).

According to the combustion-chamber structure using the piston 5-3, a contact portion between the heat-diffusion layer 73C and the piston body 50 can be provided at a contact portion between an inner peripheral surface of the opening 507 and the seal portion 733. That is, a heat-dissipation path of the heat of the heat-insulation layer 71A to the piston body 50 can be secured. Additionally, the heat-diffusion layer 73C can be cooled by injecting the cooling oil 81 toward the seal portion 733 from the oil jet nozzle 80. Accordingly, the excessive heat increase of the heat-barrier layer 72 can be prevented. Further, since the heat-insulation layer 71A exits on the back-face side of the heat-barrier layer 72 in an area of the cavity 5C where the fuel is injected from the injector 18 and thereby the temperature becomes high, the heat loss can be effectively suppressed.

Figure 18:
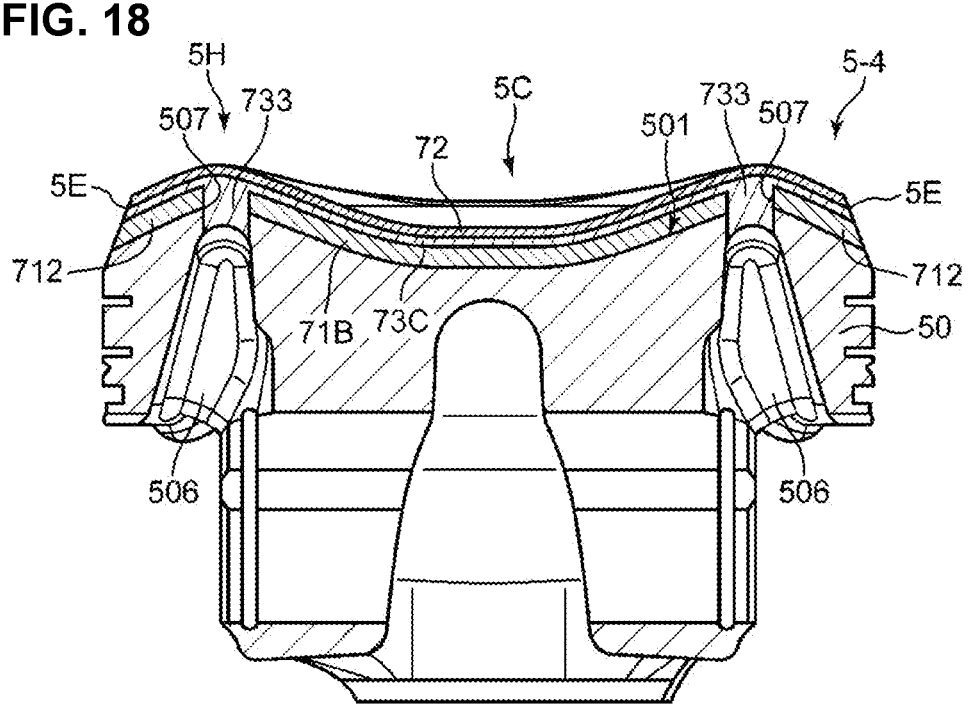
FIG. 18 is a sectional view of the piston which shows another embodiment in the case where the oil-jet cooling is applied.

FIG. 18 is a sectional view of a piston 5-4 which shows another embodiment in a case where the oil-jet cooling is applied. What is different from the piston 5-3 shown in FIG. 17A is that a heat-insulation layer 71B comprising an extension portion 712 which is positioned on the outward side, in the radial direction, of the opening 507 is used. In this embodiment as well, the contact portion between the heat-diffusion layer 73C and the piston body 50 is the contact portion between the inner peripheral surface of the opening 507 and the seal portion 733. According to this piston 5-4, since the heat-insulation layer 71A exits on the back-face side of the heat-barrier layer 72 in the entire area, in the radial direction, of the crown surface 5H, the heat loss can be suppressed further more. Herein, what the cooling oil 81 is injected toward the seal portion 733 of the heat-diffusion layer 73C from below the cooling recess portion 506 is the same as the case of the above-described piston 5-3, illustration of which is omitted here.

[Operations/Effects]

According to the combustion-chamber structure of the engine of the above-described present embodiment, the heat transferred to the heat-insulation layer 71 is not stored at this heat-insulation layer 71 and thereby a structure to make the heat escape toward the piston body 50 can be provided. That is, the heat-diffusion layer 73 is formed between the heat-insulation layer 7 and the heat-barrier layer 72. This heat-diffusion layer 73 has the larger heat conductivity than both the heat-insulation layer 71 and the heat-barrier layer 72 and comprises the contact portion (the side end edge 731 or the extension portion 732) contacting with the piston body 50. Accordingly, even if the heat-insulation layer 71 has stored the heat, this stored heat can be made to transfer to the piston body 50 through the heat-diffusion layer 73. That is, the heat stored at the heat-insulation layer 71 can be made to escape to the piston body 50, without being made to transfer to the heat-barrier layer 72. Accordingly, the excessive temperature increase of the heat-barrier layer 72 in the middle/high-load engine operation, for example, is so suppressed that the increase of the cylinder internal temperature which may cause the preignition can be prevented properly.

Further, the heat-insulation layer 71 is located at the position which corresponds to the central area, in the radial direction, of the piston body 50 where the cavity 5C is arranged. That is, the heat-insulation layer 71 is provided at the back-face side of the heat-barrier layer 72 in an area where the temperature of the piston 5 becomes high during the combustion. Accordingly, the temperature difference between the combustion gas inside the combustion chamber 6 and the heat-barrier layer 72 (crown surface 5H) can be made as small as possible, so that the heat loss can be reduced properly. Meanwhile, since the heat of the heat-insulation layer 71 is made to escape to the piston body 50 via the heat-diffusion layer 73, the temperature of the heat-barrier layer 72 can be prevented from increasing excessively.

What is claimed is:

1. A combustion-chamber structure of an engine, comprising:
   a cylinder block;
   a cylinder head;
   a piston; and
   a combustion chamber partitioned by the cylinder block, the cylinder head, and the piston,
   wherein said piston includes a piston body which has an upper surface facing said combustion chamber, a heat-insulation layer which is provided at least in a central area, in a radial direction, of said upper surface of the piston body and has smaller heat conductivity than said piston body, a heat-barrier layer which is provided to cover said upper surface of the piston and has smaller heat conductivity than said piston body and said heat-insulation layer, and a heat-diffusion layer which is provided between said heat-insulation layer and said heat-barrier layer and has larger heat conductivity than said heat-insulation layer and said heat-barrier layer, and
   said heat-diffusion layer comprises a contact portion which contacts with said piston body.

2. The combustion-chamber structure of the engine of claim 1, wherein said piston body comprises a cavity which is concaved downwardly, in a cylinder axial direction, at said upper surface, and said cavity is located at a position which corresponds to said central area, in the radial direction, of the upper surface of the piston.

3. The combustion-chamber structure of the engine of claim 2, wherein said heat-diffusion layer comprises an extension portion which extends outwardly, in the radial direction, from an outer peripheral edge of said heat-insulation layer, and said extension portion is said contact portion which contacts with the piston body.

4. The combustion-chamber structure of the engine of claim 3, wherein an outer peripheral edge of said heat-diffusion layer extends up to an outer peripheral edge of said upper surface of the piston body.

5. The combustion-chamber structure of the engine of claim 4, further comprising an oil jet device to inject cooing oil, wherein said piston body comprises a penetration hole which penetrates the piston body in the cylinder axial direction, said heat-diffusion layer comprises a seal portion which seals a part of said penetration hole near said upper surface of the piston body, and said oil jet device is configured to inject the cooling oil from below said penetration hole toward said seal portion of the heat-diffusion layer.

6. The combustion-chamber structure of the engine of claim 1, wherein said heat-diffusion layer comprises an extension portion which extends outwardly, in the radial direction, from an outer peripheral edge of said heat-insulation layer, and said extension portion is said contact portion which contacts with the piston body.

7. The combustion-chamber structure of the engine of claim 1, wherein an outer peripheral edge of said heat-diffusion layer extends up to an outer peripheral edge of said upper surface of the piston body.

8. The combustion-chamber structure of the engine of claim 1, further comprising an oil jet device to inject cooing oil, wherein said piston body comprises a penetration hole which penetrates the piston body in the cylinder axial direction, said heat-diffusion layer comprises a seal portion which seals a part of said penetration hole near said upper surface of the piston body, and said oil jet device is configured to inject the cooling oil from below said penetration hole toward said seal portion of the heat-diffusion layer.

9. The combustion-chamber structure of the engine of claim 2, wherein an outer peripheral edge of said heat-diffusion layer extends up to an outer peripheral edge of said upper surface of the piston body.

10. The combustion-chamber structure of the engine of claim 2, further comprising an oil jet device to inject cooing oil, wherein said piston body comprises a penetration hole which penetrates the piston body in the cylinder axial direction, said heat-diffusion layer comprises a seal portion which seals a part of said penetration hole near said upper surface of the piston body, and said oil jet device is configured to inject the cooling oil from below said penetration hole toward said seal portion of the heat-diffusion layer.

11. The combustion-chamber structure of the engine of claim 3, further comprising an oil jet device to inject cooing oil, wherein said piston body comprises a penetration hole which penetrates the piston body in the cylinder axial direction, said heat-diffusion layer comprises a seal portion which seals a part of said penetration hole near said upper surface of the piston body, and said oil jet device is configured to inject the cooling oil from below said penetration hole toward said seal portion of the heat-diffusion layer.

12. The combustion-chamber structure of the engine of claim 6, wherein an outer peripheral edge of said heat-diffusion layer extends up to an outer peripheral edge of said upper surface of the piston body.

13. The combustion-chamber structure of the engine of claim 6, further comprising an oil jet device to inject cooing oil, wherein said piston body comprises a penetration hole which penetrates the piston body in the cylinder axial direction, said heat-diffusion layer comprises a seal portion which seals a part of said penetration hole near said upper surface of the piston body, and said oil jet device is configured to inject the cooling oil from below said penetration hole toward said seal portion of the heat-diffusion layer.

14. The combustion-chamber structure of the engine of claim 7, further comprising an oil jet device to inject cooing oil, wherein said piston body comprises a penetration hole which penetrates the piston body in the cylinder axial direction, said heat-diffusion layer comprises a seal portion which seals a part of said penetration hole near said upper surface of the piston body, and said oil jet device is configured to inject the cooling oil from below said penetration hole toward said seal portion of the heat-diffusion layer.

15. The combustion-chamber structure of the engine of claim 9, further comprising an oil jet device to inject cooing oil, wherein said piston body comprises a penetration hole which penetrates the piston body in the cylinder axial direction, said heat-diffusion layer comprises a seal portion which seals a part of said penetration hole near said upper surface of the piston body, and said oil jet device is configured to inject the cooling oil from below said penetration hole toward said seal portion of the heat-diffusion layer.

16. The combustion-chamber structure of the engine of claim 12, further comprising an oil jet device to inject cooing oil, wherein said piston body comprises a penetration hole which penetrates the piston body in the cylinder axial direction, said heat-diffusion layer comprises a seal portion which seals a part of said penetration hole near said upper surface of the piston body, and said oil jet device is configured to inject the cooling oil from below said penetration hole toward said seal portion of the heat-diffusion layer.

17. The combustion-chamber structure of the engine of claim 1, wherein the heat conductivity of said heat-barrier layer is within a range of 0.05-1.50 W/mK, and the heat conductivity of said heat-diffusion layer is within a range of 35-600 W/mK.

18. The combustion-chamber structure of the engine of claim 1, wherein said heat-barrier layer is made of heat-resistant silicon resin, and said heat-diffusion layer is made of copper-based material, Corson alloy, beryllium copper, fiber-reinforced aluminum alloy, or titanium aluminum.

19. A combustion-chamber structure of an engine, comprising:
  a cylinder block;
  a cylinder head;
  a piston; and
  a combustion chamber partitioned by the cylinder block, the cylinder head, and the piston,
  wherein said piston comprises a piston body which has an upper surface facing said combustion chamber, a heat-insulation layer which is provided only in a central area, in a radial direction, of said upper surface of the piston body and has smaller heat conductivity than said piston body, a heat-diffusion layer which is provided to cover an entire part of an upper surface of said heat-insulation layer and has larger heat conductivity than the heat-insulation layer, and a heat-barrier layer which is provided to cover at least both of an entire part of an upper surface of said heat-diffusion layer and an outside area, in the radial direction, of said upper surface of the piston body and has smaller heat conductivity than said piston body, said heat-insulation layer, and said heat-diffusion layer, and
  said heat-diffusion layer comprises a contact portion which contacts with said piston body.

20. A combustion-chamber structure of an engine, comprising:
- a cylinder block;
- a cylinder head;
- a piston; and
- a combustion chamber partitioned by the cylinder block, the cylinder head, and the piston,
- wherein said piston comprises a piston body which has an upper surface facing said combustion chamber, a heat-insulation layer which is provided only in a central area, in a radial direction, of said upper surface of the piston body and has smaller heat conductivity than said piston body, a heat-diffusion layer which is provided to cover both of an entire part of an upper surface of said heat-insulation layer and an outside area, in the radial direction, of said upper surface of the piston body and has larger heat conductivity than the heat-insulation layer, and a heat-barrier layer which is provided to cover an entire part of an upper surface of said heat-diffusion layer and has smaller heat conductivity than said piston body, said heat-insulation layer, and said heat-diffusion layer, and
- said heat-diffusion layer comprises a contact portion which contacts with said piston body.

* * * * *